(12) United States Patent
Kraenzle

(10) Patent No.: US 7,401,860 B2
(45) Date of Patent: Jul. 22, 2008

(54) APPARATUS FOR A VEHICLE FOR DUMPING AND PROVIDING GROUND ACCESS

(76) Inventor: David G. Kraenzle, 12845 Big Bend Blvd., St. Louis, MO (US) 63122

( * ) Notice: Subject to any disclaimer, the term of this patent is extended or adjusted under 35 U.S.C. 154(b) by 227 days.

(21) Appl. No.: 11/149,344

(22) Filed: Jun. 9, 2005

(65) Prior Publication Data

US 2006/0279131 A1   Dec. 14, 2006

(51) Int. Cl.
*B60P 1/32* (2006.01)
(52) U.S. Cl. .......................... 298/12; 298/14; 298/16; 298/17 SG; 414/477
(58) Field of Classification Search .................. 298/12, 298/13, 14, 16, 1 A, 17 SG; 414/477, 480
See application file for complete search history.

(56) References Cited

U.S. PATENT DOCUMENTS

| | | | |
|---|---|---|---|
| 2,717,707 A | 9/1955 | Martin |
| 3,454,175 A | 7/1969 | Kellaway |
| 3,550,801 A | 12/1970 | Larson et al. |
| 3,964,626 A | 6/1976 | Arregui |
| 4,126,357 A | 11/1978 | Day |
| 4,139,236 A | 2/1979 | Hill et al. |
| 4,239,275 A | 12/1980 | Horneys et al. |
| 4,353,597 A | 10/1982 | Shoup |
| 4,660,843 A | 4/1987 | Hicks |
| 4,702,662 A | 10/1987 | Marlett |
| 4,802,811 A | 2/1989 | Nijenhuis |
| 4,840,532 A | 6/1989 | Galbreath |
| 4,929,142 A | 5/1990 | Nespor |
| 5,011,362 A | 4/1991 | Pijanowski |
| 5,133,633 A | 7/1992 | Grata |
| 5,192,189 A | 3/1993 | Murata et al. |
| 5,246,330 A | 9/1993 | Marmur et al. |
| 5,263,807 A | 11/1993 | Pijanowski |
| 5,816,765 A | 10/1998 | Pijanowski |
| 6,176,672 B1 | 1/2001 | Egan et al. |
| 6,390,761 B1 | 5/2002 | Palmer, Jr. et al. |
| 6,419,292 B1 | 7/2002 | Calcote et al. |
| 6,641,353 B2 | 11/2003 | Oliver |
| 6,755,479 B1 | 6/2004 | Meeks |
| 2002/0164239 A1 | 11/2002 | Angermeier |

FOREIGN PATENT DOCUMENTS

| | | |
|---|---|---|
| CA | 990762 | 6/1976 |
| EP | 0 194 594 | 9/1986 |
| FR | 2167718 | 8/1973 |
| JP | 52-22166 | 2/1977 |
| JP | 55-51628 | 4/1980 |
| JP | 61-37546 | 2/1986 |
| JP | 63-21158 | 1/1988 |

OTHER PUBLICATIONS

US application entitled Apparatus for a Vehicle for Dumping and Providing Ground Access, filed Jun. 9, 2005, Kraenzle.

*Primary Examiner*—Stephen Gordon
(74) *Attorney, Agent, or Firm*—Harness, Dickey & Pierce, P.L.C.

(57) ABSTRACT

An apparatus generally includes a dump frame pivotably coupled to a vehicle's chassis, and a slide frame slidably coupled to the dump frame. The apparatus further includes at least one slide frame actuator for causing sliding movement of the slide frame, and at least one dump frame actuator for causing pivotal movement of the dump frame.

13 Claims, 37 Drawing Sheets

APPARATUS FOR A VEHICLE FOR DUMPING AND PROVIDING GROUND ACCESS

FIELD OF THE INVENTION

The present invention generally relates to apparatus for a vehicle for dumping and providing ground access, such as a bed of a pickup truck.

BACKGROUND OF THE INVENTION

People commonly transport heavy loads within the bed of a pickup truck. Depending on the load (e.g., riding lawn mower, four wheel all-terrain vehicle, motorcycle, etc.), it may be necessary to back the truck up to a platform at an elevation approximately equal to that of the bed in order to slide or roll the load onto/off of the bed. As an alternative, the load may be slid or rolled onto a ramp positioned between the ground and the bed during loading or unloading. In addition, sand, gravel, dirt, and rock are commonly hauled in a pickup truck bed. And, although some designs may permit limited tilting of the bed to facilitate unloading, such designs are usually limited to low tilt angles that are not sufficient for dumping. In which case, the load must still be shoveled or otherwise pushed off the tilted bed.

SUMMARY OF THE INVENTION

According to one aspect of the present invention, an apparatus generally includes a dump frame pivotably coupled to a vehicle's chassis for pivotal movement relative to the chassis. The apparatus also includes a slide frame for supporting a load. The slide frame is slidably coupled to the dump frame such that the slide frame is longitudinally slidable relative to the dump frame, and such that the slide frame pivots along with the dump frame relative to the chassis. The apparatus further includes at least one slide frame actuator for causing sliding movement of the slide frame, and at least one dump frame actuator for causing pivotal movement of the dump frame.

According to another aspect of the present invention, an apparatus generally includes a dump frame pivotably coupled to a vehicle's chassis for pivotal movement relative to the chassis. The apparatus also includes a slide frame for supporting a load. The slide frame is slidably coupled to the dump frame such that the slide frame is longitudinally slidable relative to the dump frame, and such that the slide frame pivots along with the dump frame relative to the chassis. The apparatus further includes at least one seal for substantially sealing at least one sliding surface to thereby inhibit the ingress of foreign objects and debris to the sliding surface.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of various embodiments is merely exemplary in nature and is in no way intended to limit the invention, its applications, or uses.

FIGS. 1 through 10 illustrate one embodiment of an apparatus 100 that can be used with a vehicle 102 for dumping and providing ground access. While the illustrated embodiments depict the apparatus 100 being used with a pickup truck, aspects of the invention are not so limited. The design of the apparatus 100 is efficient enough (e.g., compact, relatively light weight, etc.) to be used on a vehicle as small as a pickup truck, but embodiments could also be relatively easily adapted to fit a larger truck or trailer. Indeed, aspects of the present invention can be applied to a wide range of vehicles, including pickup trucks, other larger commercial-type trucks, trailers, and other vehicles having a chassis to which can be attached load-carrying apparatus (e.g., load-carrying platforms and beds, etc.). Accordingly, the specific references to trucks herein should not be construed as limiting the scope of the present invention to any specific form/type of vehicle.

Figure 2:
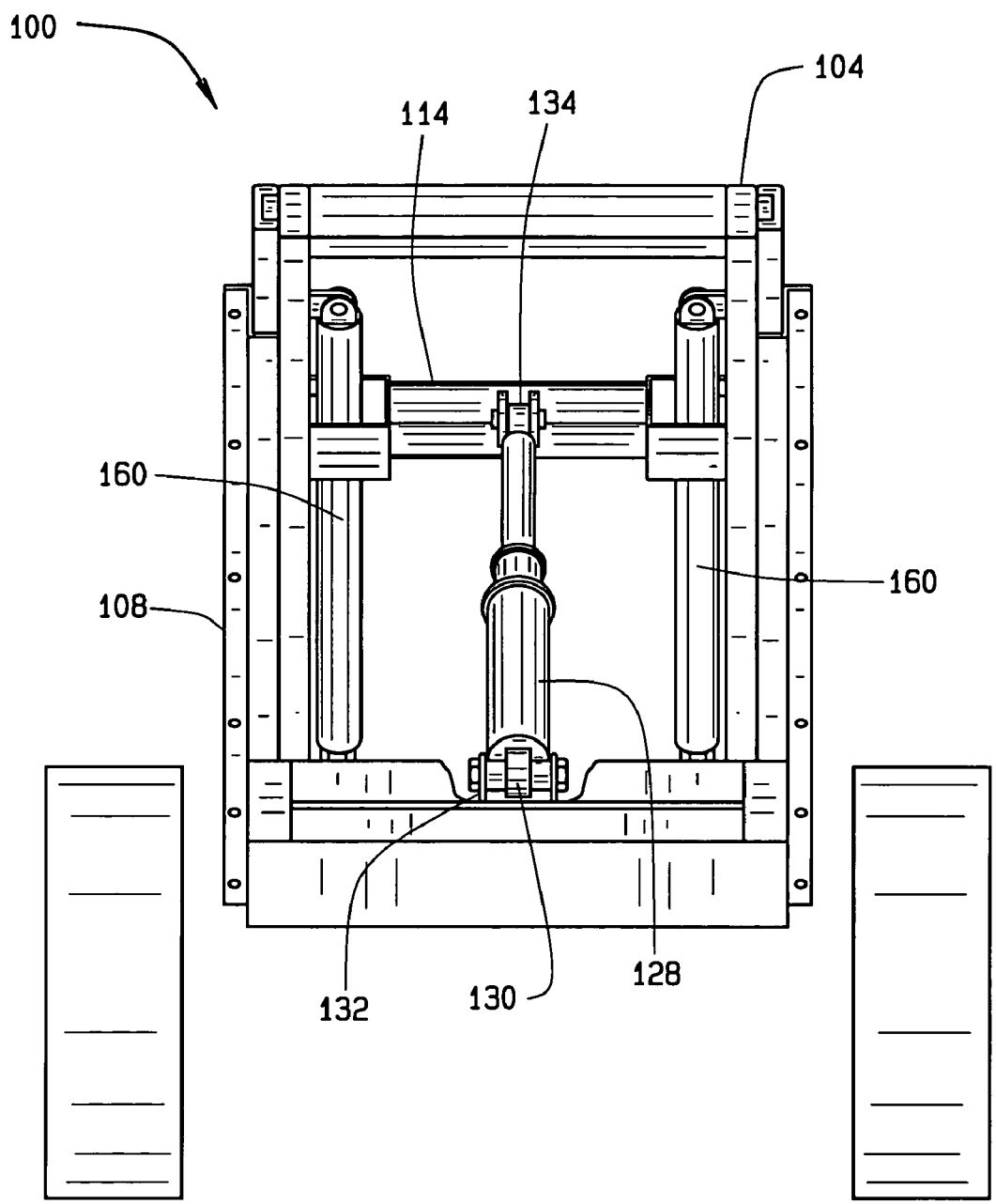
FIG. 2 is a front view of the truck shown in FIG. 1 with the cab removed for clarity.
Figure 3:
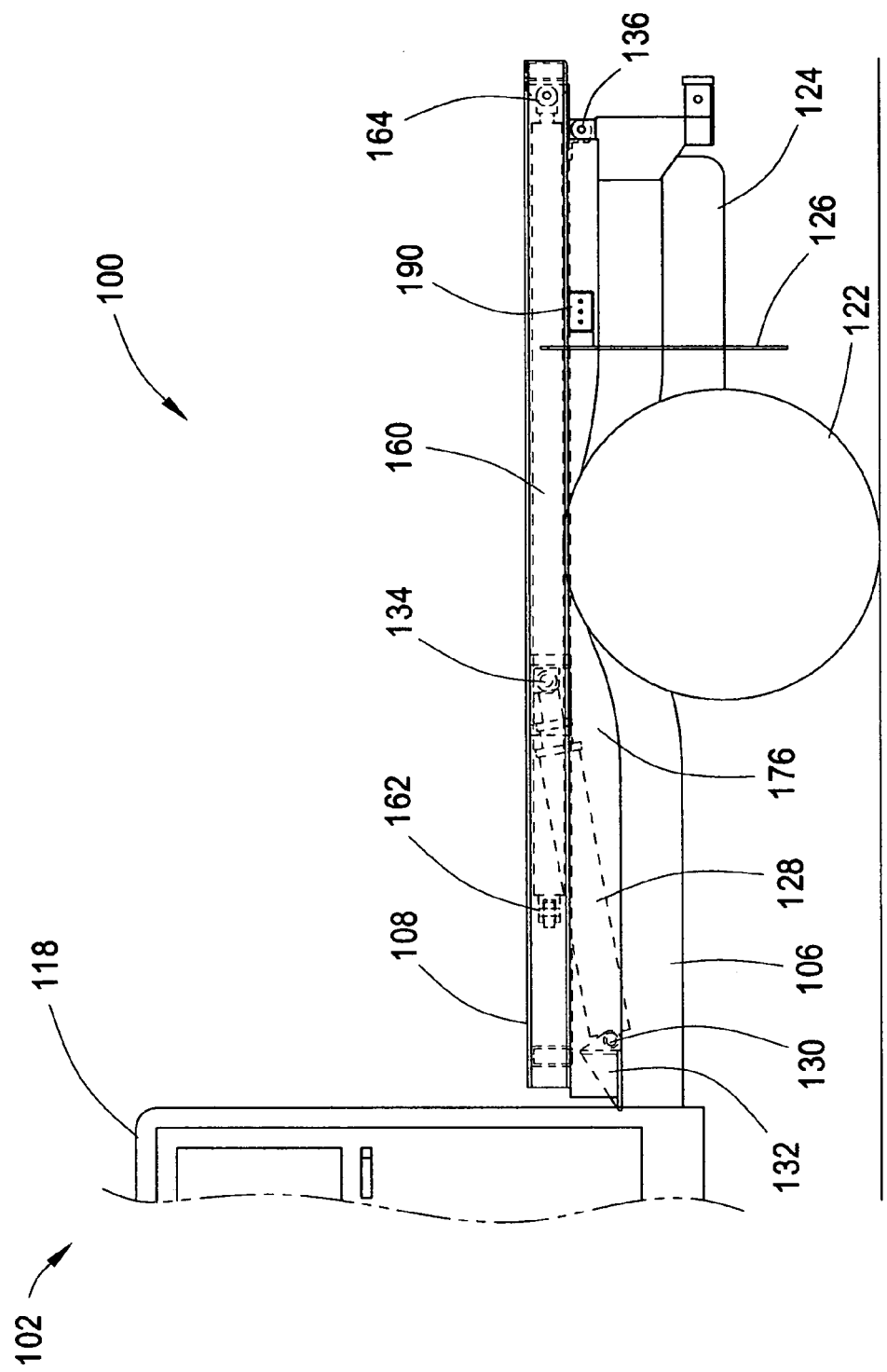
FIG. 3 is a side view of the truck shown in FIG. 1 and illustrating the apparatus in a transport position.
Figure 4:
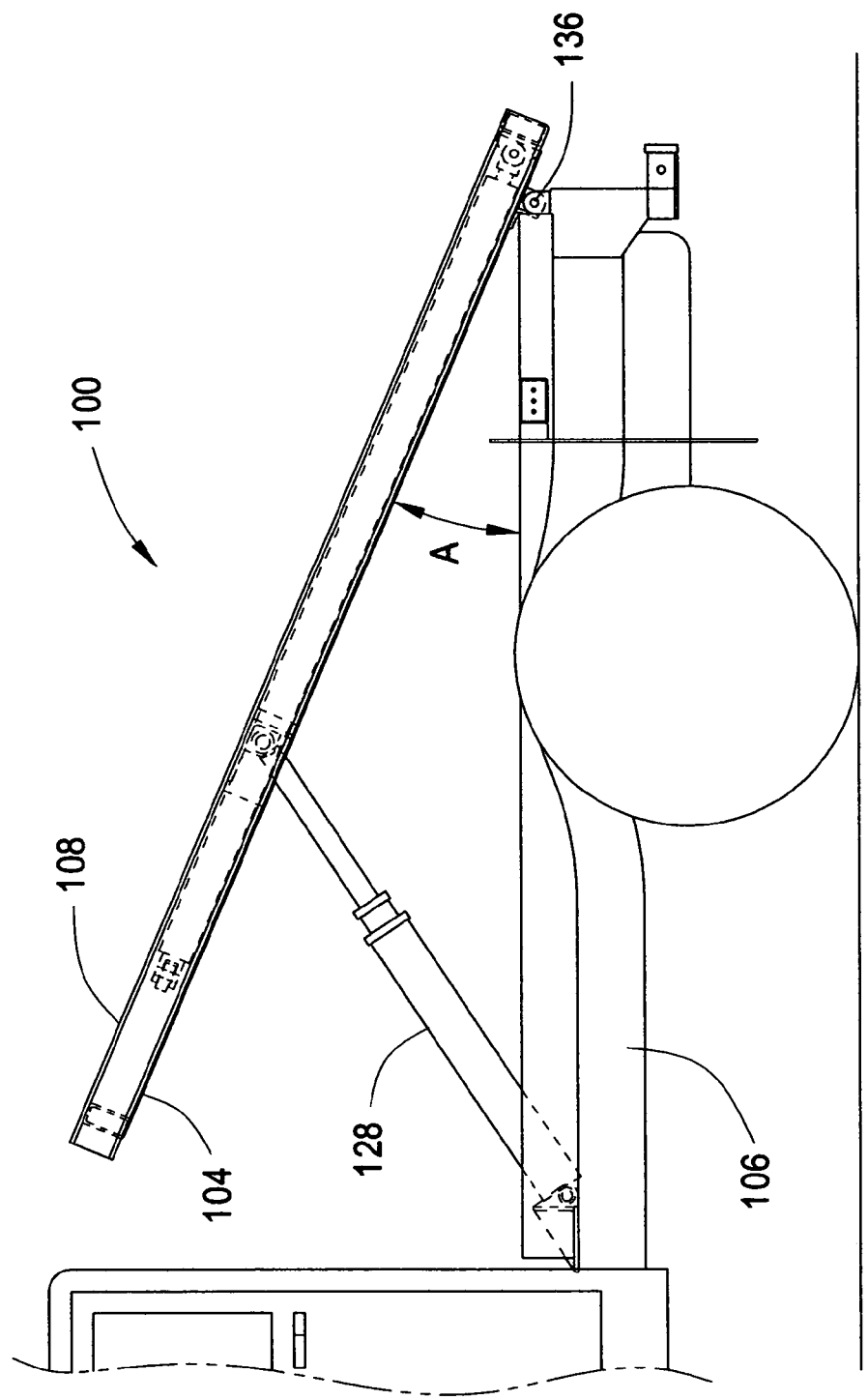
FIG. 4 is a side view of the truck shown in FIG. 1 and illustrating the apparatus in an intermediate dump position.
Figure 5:
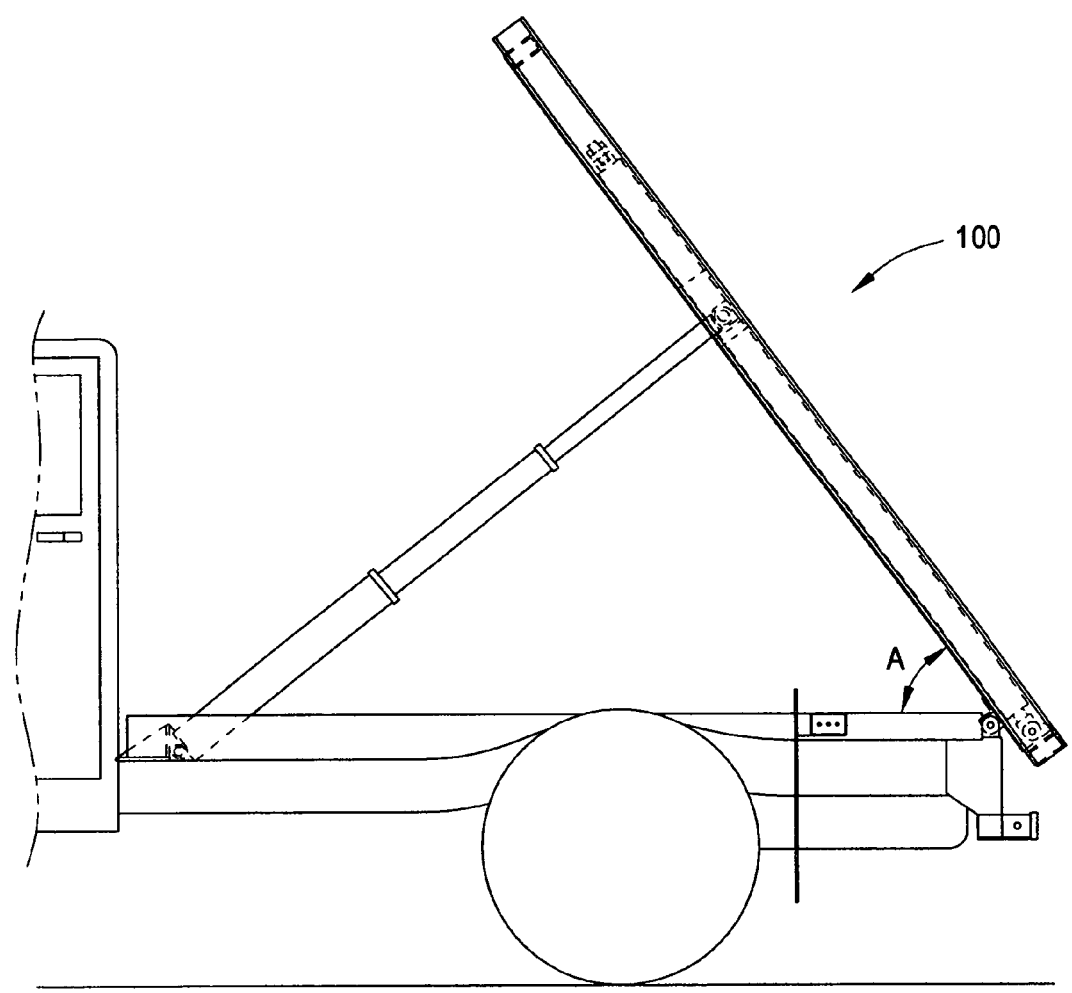
FIG. 5 is a side view of the truck shown in FIG. 1 and illustrating the apparatus in a dump position.
Figure 6:
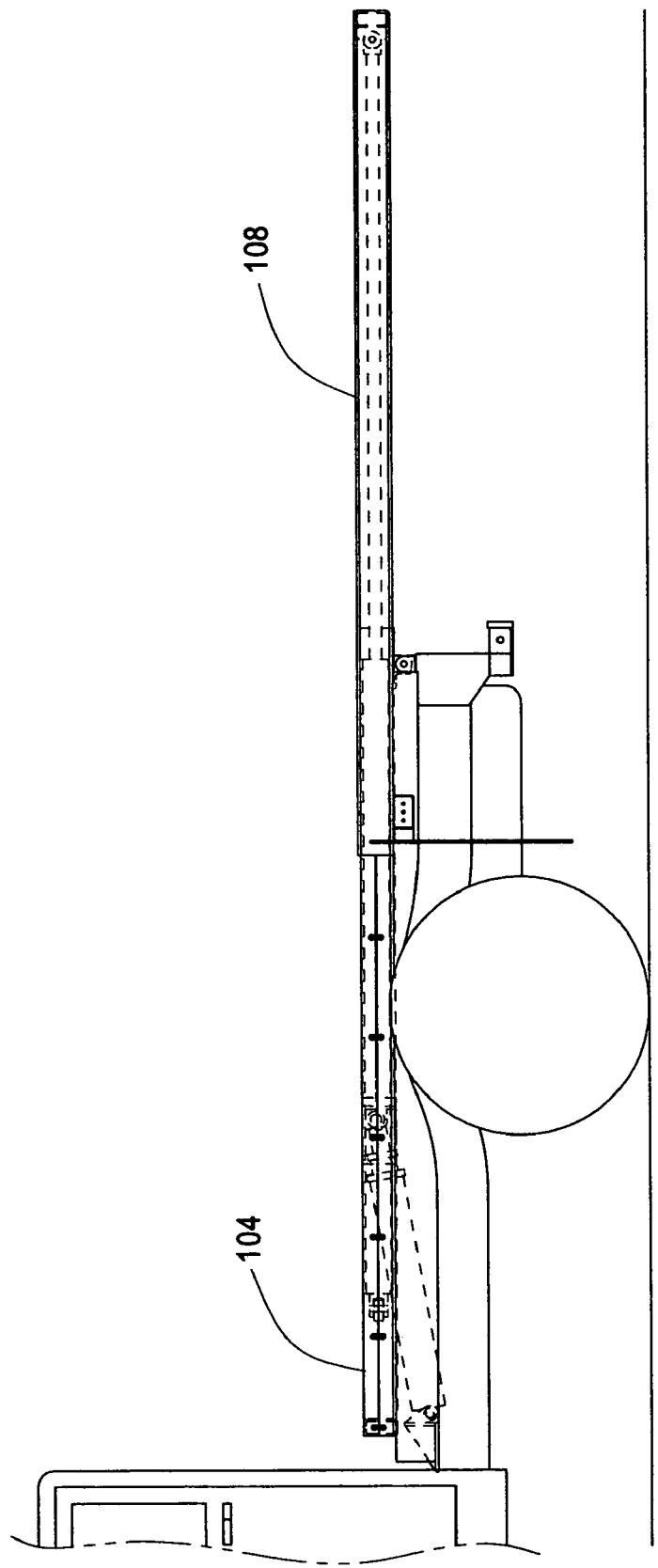
FIG. 6 is a side view of the truck shown in FIG. 1 and illustrating the apparatus in a slidably extended position.
Figure 7:
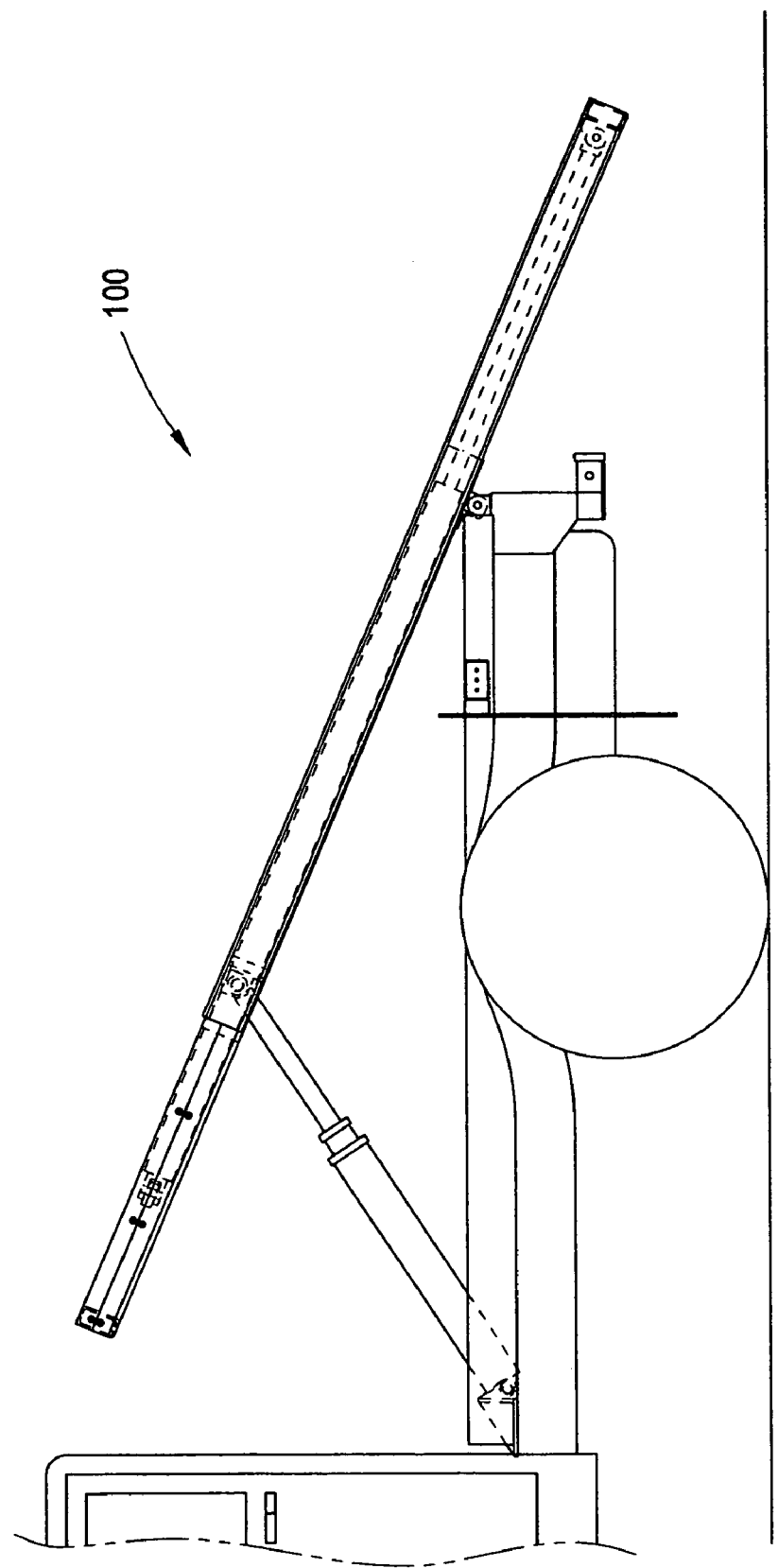
FIG. 7 is a side view of the truck shown in FIG. 1 and illustrating the apparatus in an intermediate load/dump position.

With continued reference to FIGS. 1 through 10, the apparatus 100 includes a dump frame 104 pivotably coupled to the truck's chassis 106. As shown by comparing FIGS. 3 and 4, the dump frame 104 is pivotal relative to the chassis 106. The apparatus 100 also includes a slide frame 108 slidably coupled to the dump frame 104. As shown by comparing FIGS. 3 and 6, the slide frame 108 is longitudinally slidable relative to the dump frame 104. The slide frame 108 pivots along with the dump frame 104 relative to the chassis 106, as shown in FIG. 4.

Figure 9:
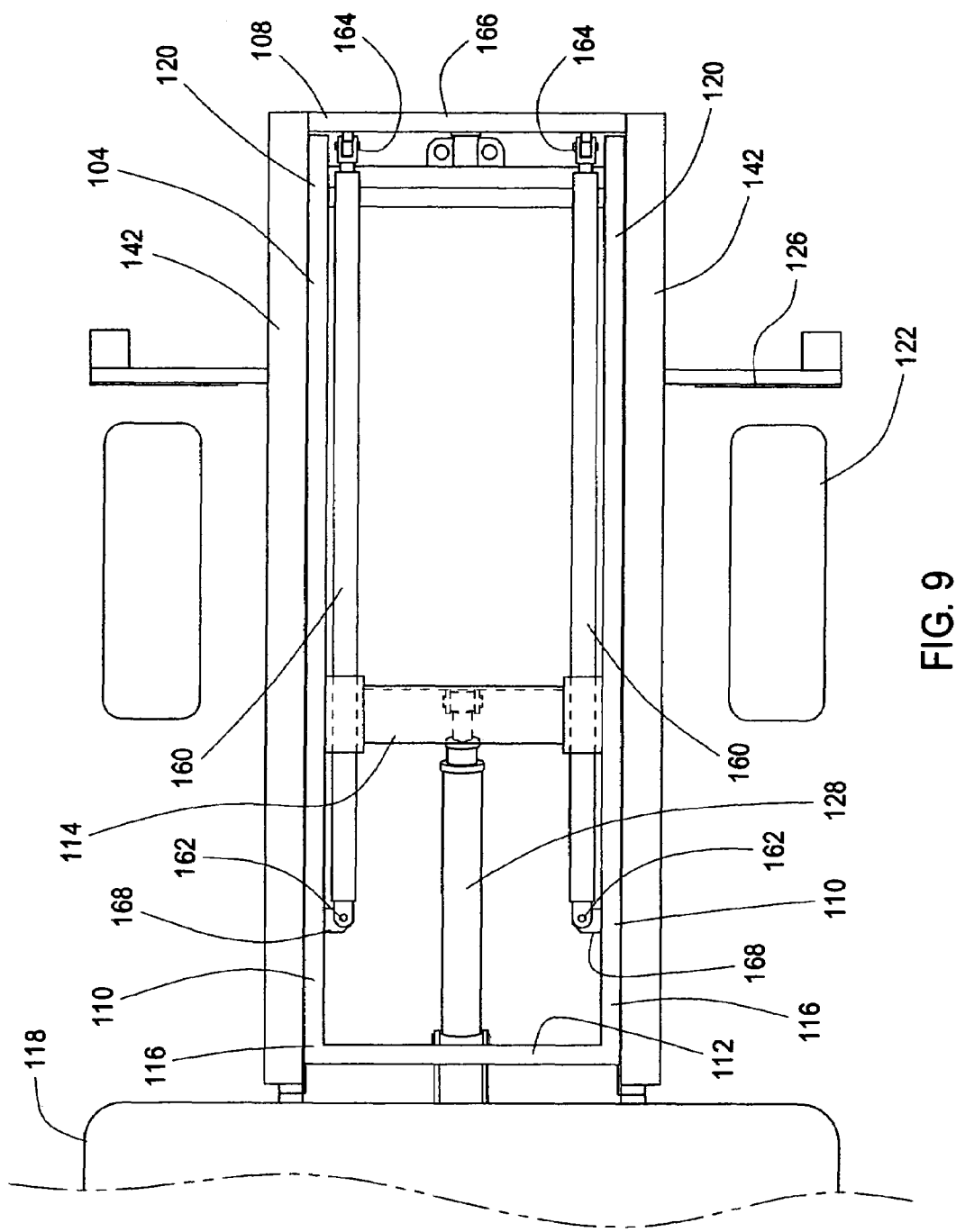
FIG. 9 is a top view of the truck shown in FIG. 1 and illustrating the apparatus in a transport position.

With further reference to FIG. 9, the dump frame 104 is generally rectangular in shape. The dump frame 104 includes a pair of longitudinal members 110, a front cross member 112, and an intermediate cross member 114. Each longitudinal member 110 has a front end portion 116 adjacent the truck's cab 118, and a rear end portion 120 disposed aft of the truck's rear wheels 122, spare tire 124, and mud flaps 126. The front cross member 112 extends transversely between the front end portions 116. The intermediate cross member 114 also extends transversely between the longitudinal members 110 but at a position aft of the front cross member 112. Having the front cross member 112 disposed between the front end portions 116 enhances rigidity of the dump frame 104. This can be advantageous, for example, when the force for causing pivotal movement of the dump frame 104 is applied at a single location. In other embodiments, the front cross member 112 is not necessarily required and can be eliminated, for example, when the load for causing pivotal movement of the dump frame is more evenly distributed along a width defined between the longitudinal dump frame members 110.

As shown in FIGS. 1 through 4, the apparatus 100 further includes at least one dump frame actuator 128 for causing pivotal movement of the dump frame 104 relative to the chassis 106. In the illustrated embodiment, the dump frame actuator 128 includes a telescoping hydraulic cylinder. In other embodiments, however, the dump frame actuator 128 can be a pneumatic actuator, an electrically-operated actuator, non-cylindrical actuators, among other suitable actuation devices. For example, and as described below, FIGS. 25 through 30 illustrate another embodiment of an apparatus 300 in which the actuation power for causing the pivotal movement is provided by a dump frame actuator 328 coupled to a linkage 394 also commonly referred to as a scissors. The combination of a dump frame actuator and scissors is commonly referred to as a scissors hoist. In the illustrated embodiment, the dump frame actuator 328 is directly connected to the scissors 394. Alternatively, other embodiments include a dump frame actuator that is not directly connected to the scissors. In such alternative embodiments, the dump frame actuator is instead connected to the dump frame at one location, with the scissors being connected to the dump frame at a different location than the dump frame actuator.

While only one dump frame actuator 128 is shown in the FIGS. 1 through 4, alternative embodiments include a plurality of dump frame actuators that cooperate to provide the actuation power for pivotably moving the dump frame relative to the chassis. In addition, the hoses for connecting the dump frame actuator 128 to its power source have been removed for clarity.

In various embodiments, the dump frame actuator 128 receives power from a hydraulic pump mounted on the vehicle's engine. In another embodiment, the dump frame actuator 128 receives its power from a self-contained standalone electrically driven hydraulic power unit, which may, for example, be contained within the space (generally indicated by arrow 129 in FIG. 1) defined by the vehicle's chassis 106 or at other suitable locations. Alternatively, other suitable means can be employed for providing power to the dump frame actuator 128. For example, the dump frame actuator 128 may receive hydraulic power generated by a hydraulic pump driven off of the truck's transmission. Or, for example, a wide range of non-hydraulic power sources (e.g., electric motors in combination with gear drives, screw drives, cables and pulleys, chains and sprockets, etc.) may be used for causing the dumping pivotal movement.

As shown in FIGS. 2 and 3, the dump frame actuator 128 is a hydraulic cylinder with a first end 130 pivotally mounted to a bracket 132 of a cross member of the truck chassis 106. In various embodiments, the apparatus 100 may be retrofit onto an existing vehicle in which case the bracket 132 may be an integral part of an replacement cross member that is coupled to the vehicle chassis after removing an existing cross member.

The dump frame actuator 128 also includes a second end 134 pivotably mounted to the cross member 114 of the dump frame 104. In the illustrated embodiment, the first end 130 generally refers to the base end of the hydraulic cylinder 128. The second end 134 generally refers to the end of the shaft or rod, which, in turn, is engaged with a piston (not shown) within the hydraulic cylinder 128. In other embodiments, however, the first and second ends 130 and 134 may be reversed such that the base end of the actuator cylinder is pivotably mounted to the cross member 114, and the rod end is pivotably mounted to the truck chassis 106. Alternatively, other types of actuators (e.g., non-hydraulic actuators, pneumatic actuators, electrical actuators, non-cylindrical actuators, telescoping actuators, etc.) can also be employed with their first and second ends respectively coupled to the cross member 114 and the chassis 106, or vice versa.

During operation, the dump frame actuator 128 provides the actuation power for causing pivotal movement of the dump frame 104 relative to the chassis 106, or more specifically, about pivots 136. In the illustrated embodiment of FIG. 4, each pivot 136 includes a hinge mounted to one of the longitudinal members 110 and a rear end portion of the truck chassis 106.

The pivotal movement of the dump frame 104 creates an angle A (FIG. 5) defined generally between the dump frame 104 and the chassis 106. In various embodiments, the apparatus 100 is configured to be pivotable to an angle A that exceeds ninety degrees from the transport position (the transport position is shown in FIG. 3). Generally, the angle A should be at least about thirty-five degrees to be considered a sufficient angle for dumping operations.

The dump frame 104 and dump frame actuator 128 are located within the width of the chassis 106. Alternatively, however, either or both of the dump frame 104 and/or dump frame actuator 128 can be located outside the width of the chassis 106.

Figure 21:
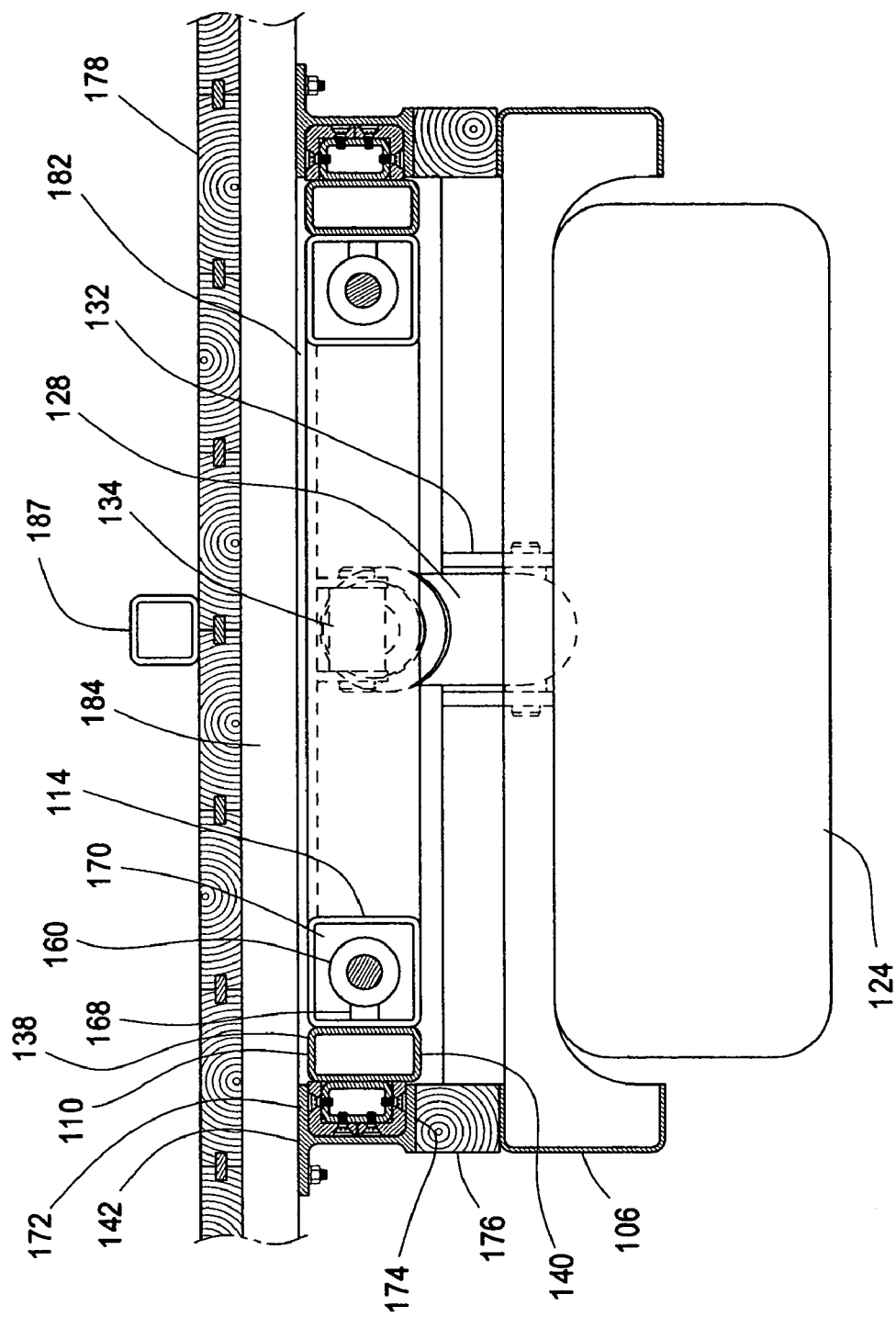
FIG. 21 is a rear transverse cross-sectional view of a portion of the truck as shown in FIG. 20.

As shown in FIG. 21, the second end 134 of the dump frame actuator 128 is vertically disposed at least partially within the height defined between the dump frame's top and bottom surfaces 138 and 140. This helps keep the apparatus 100 relatively compact with a relatively low profile.

As best shown in FIG. 9, the cross member 114 is closer to the front end portions 116 of the longitudinal members 110 than the rear end portions 120. Having the middle cross member 114 (to which the dump frame actuator 128 applies the pivoting force) closer to the front of the dump frame 104 advantageously creates a longer moment arm relative to the pivots 136, thereby allowing the apparatus 100 to be pivoted with less applied force. But this more forward positioning of the middle cross member 114 also reduces the available space for the dump frame actuator 128 and increases its required stroke length. Accordingly, the inventor hereof has recognized that positioning of the middle cross member 112 involves a tradeoff between actuator size/stroke length and the moment arm length. In the illustrated embodiment, the reduced available space/stroke length for the actuator 128 resulting from the more forward positioning of the middle cross member 114 is mitigated (at least in part) by positioning the dump frame actuator's first end 130 adjacent the cab 118.

Alternatively, the cross member 114 can be more centrally located relative to the dump frame 104. Or, for example, the cross member 114 can be located closer to the rear end portions 120 than the front end portions 116 of the dump frame longitudinal members 110. In yet other embodiments, the dump frame 104 can include more than one cross member between the front and rear end portions 116 and 120.

Figure 10:
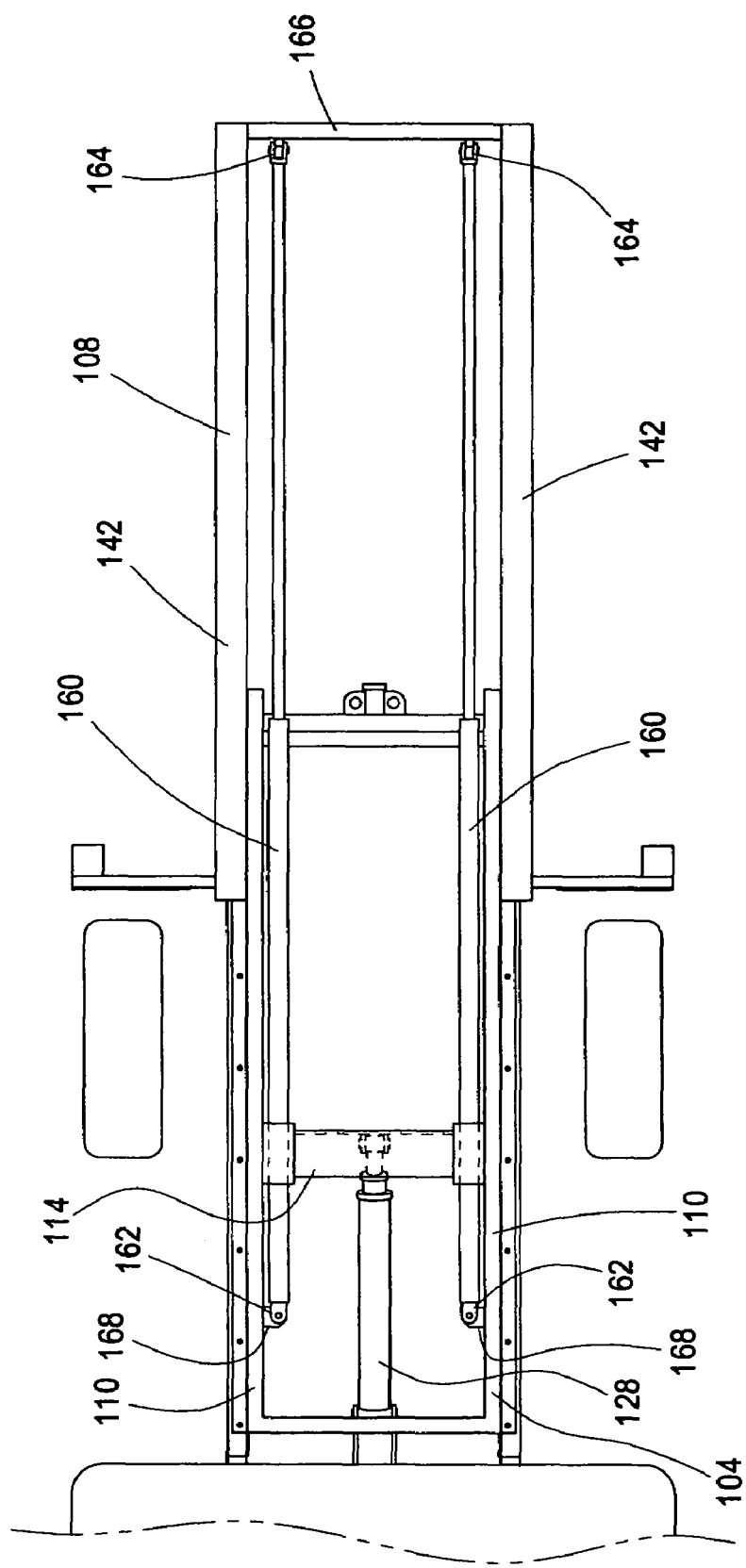
FIG. 10 is a top view of the truck shown in FIG. 1 and illustrating the apparatus in a slidably extended position.
Figure 22:
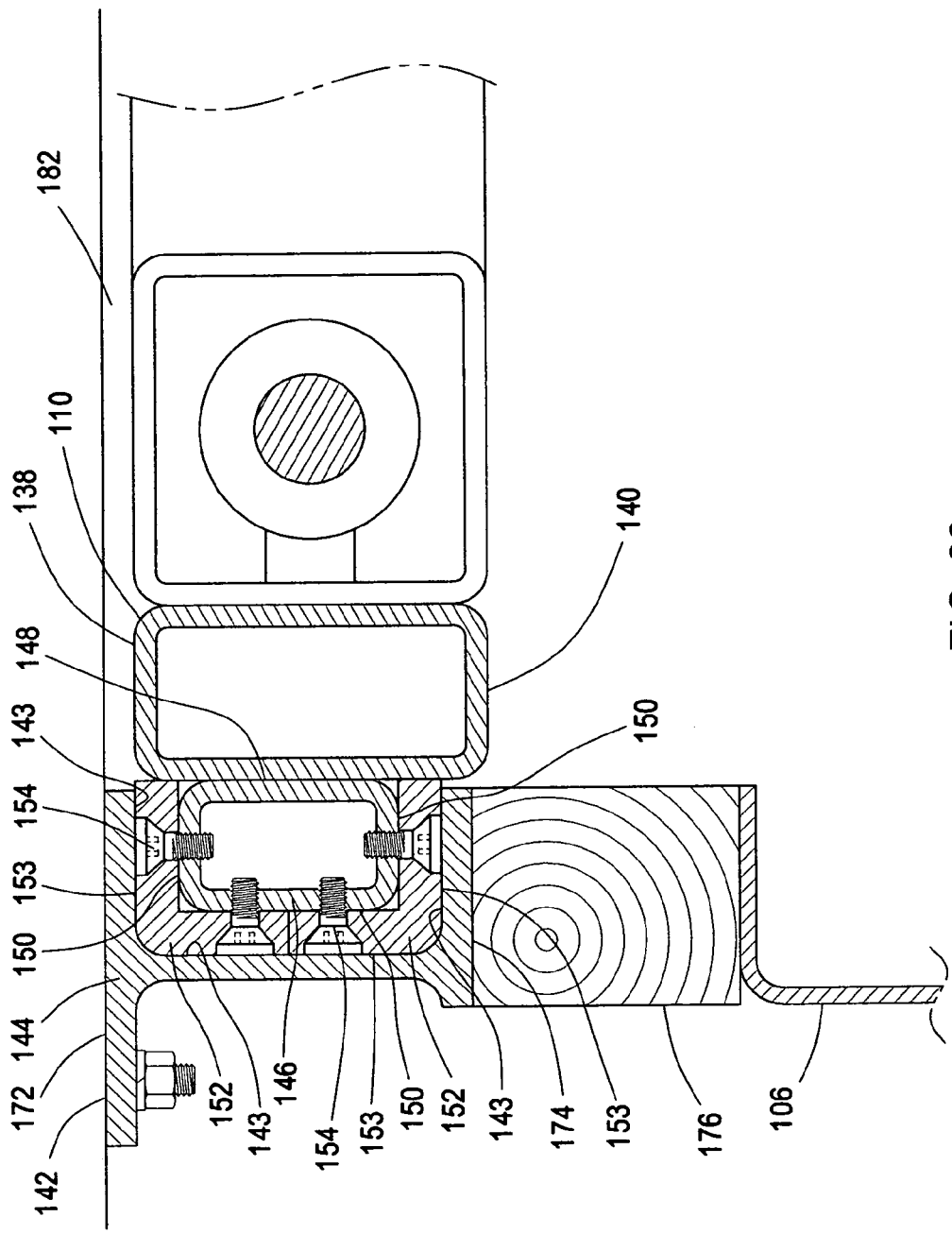
FIG. 22 is a rear transverse cross-sectional view of a portion of FIG. 21.

With further reference to FIGS. 9 and 10, the slide frame 108 has a generally rectangular shape. The slide frame 108 includes a pair of longitudinal members or slide rails 142 disposed at least partially outside the dump frame 104. As shown in FIG. 22, each longitudinal member 142 includes a generally U-shaped or C-shaped channel 144 with sliding surfaces 143. Alternatively, other embodiments include a slide frame having differently configured longitudinal members that define channels other than U-shaped or C-shaped. In the illustrated embodiment, the slide rails 142 are made from steel I-beams. Alterative embodiments, however, include slide rails made from other suitable materials (e.g., aluminum, stainless steel, etc.) and shapes such as C-channels, among other suitable configurations including custom fabricated shapes.

Each engagement portion 146 has a generally rectangular shape with a side 148 attached to the corresponding longitudinal member 110 of the dump frame 104. Each engagement portion 146 also includes three other sides or surfaces 150 that are received within the channel 144. Alternatively, the engagement portions 146 can be configured in other suitable shapes depending, for example, on the particular application.

In the particular illustrated embodiment of FIG. 22, bearing material 152 is removably attached to the dump frame surfaces 150 to provide sliding surfaces 153 that mate with the sliding surfaces 143 of the longitudinal members 142. The bearing material 152 is configured to make contact with the sliding surfaces 143 along substantially the entire length of the sliding surfaces 143 to inhibit foreign objects and debris from contacting the sliding surfaces 143 and 153. Applied in this manner, the bearing material 152 provides a replaceable wear pad that substantially seals the sliding surfaces 143 and 153 of the apparatus 100. For the embodiment shown in FIG. 22, the bearing material 152 is removably attached to the dump frame 104. Alternative embodiments include bearing material that is removably or fixedly attached within the slide frame channel. In such embodiments, the sliding surfaces include the surface(s) of the bearing material and the dump frame that slidably contact one another as the slide frame slides relative to the dump frame.

Additional alternative embodiments include a dump frame having a channel (e.g., U-shaped channel, C-shaped channel, among other channel shapes, etc.), and a slide frame having a generally rectangular portion (or other suitably shaped portion) that is received within the dump frame channel. Bearing material may be removably or fixedly attached within the dump frame channel, and/or bearing material removably or fixedly attached to the slide frame surfaces. Other embodiments, however, do not include bearing material within either the dump frame channel or attached to the slide frame surfaces.

With continued reference to FIG. 22, the bearing material 152 is removably attached to the dump frame 104 at surfaces 150 by screws 154. The screws 154 are recessed into the bearing material 152 such that the screws do not contact or scrape against the sliding surfaces 143 defining the slide frame channel 144.

Alternatively, a wide range of other suitable attachment means can be used for removably attaching the bearing material 152 to the dump frame 104. For example, other embodiments include bearing material that is removably attached by adhesive, rivets, clamps, snap fit, or any other suitable means. In addition, the illustrated bearing material 152 has a two-piece construction including an upper portion and a lower portion. Alternatively, other embodiments include bearing material having a single-piece or monolithic construction (e.g., bearing material 852 in FIG. 35), and/or a multi-piece construction (e.g., three-piece construction, etc). Instead of, or in addition, to the bearing material 152 removably attached to the dump frame, alternative embodiments include bearing material that is removably or fixedly attached to the slide frame. In such embodiments, this bearing material can be disposed within the channel along the slide frame surfaces defining the channel.

In various embodiments, the bearing material 152 is disposed along the entire longitudinal length (or at least substantially the entire longitudinal length) of the dump frame surfaces 150. With the bearing material 152 disposed longitudinally along the sliding surface 153, the bearing material 152 substantially seals the sliding surfaces 143 and 153 and inhibits foreign objects and debris, such as dirt, dust, grime, sand, grit, and other abrasive particles, from contacting the sliding surfaces 143 and 153. Accordingly, the bearing material 152, applied in this manner, can help keep the sliding surfaces 143 and 153 in a relatively clean condition. This, in turn, can advantageously provide a more aesthetically pleasing mechanism while also prolonging the useful life of the sliding surfaces 143 and 153. In the illustrated embodiment of FIG. 22, the bearing material 152 has a width about equal to the width of the slide frame surfaces 143 such that the bearing material 152 entirely covers (or at least substantially entirely covers) the slide frame surfaces 143. In other embodiments, however, the bearing material 152 can have a width less than or greater than the width of the slide frame surfaces 143 depending on the particular application. For example, another embodiment includes a generally continuous strip of bearing material that is narrower than the slide frame surface along which the bearing material is longitudinally disposed.

In addition to this advantageous sealing effect, the bearing material 152 also reduces the friction associated with the relative sliding movement between the dump frame 104 and the slide frame 108. In other words, there is less friction as the sliding surfaces 143 of the slide frame channel 144 slide relative to the sliding surfaces 153 of the bearing material 152 as compared to those embodiments in which there is no bearing material such that the dump frame directly contacts the slide frame as the slide frame slides relative to the dump frame.

By having bearing material 152 disposed along the entire length (or at least substantially the entire length) of the dump frame surfaces 150, the load is better distributed along the entire length of the bearing material 152 such that a lubricant (e.g., grease, etc.) may not be necessary. And, without such grease or other lubricant, the apparatus 100 can remain a lot cleaner because there will be no grease or other lubricant to which dust and other particulates can adhere and accumulate. This, in turn, can prolong the useful life of the sliding surfaces 143 and 153. Also, should any dirt or other particulates make contact with the sliding surfaces 143 and 153, because there is no grease present, the dirt can be easily washed or blown away after extending the slide frame 108 to expose the sliding surfaces 143 and/or 153.

These particular aspects of the invention relating to bearing materials and full-length replaceable wear pads (as can all other aspects of the invention) can be used individually or in combination with any one or more of the other aspects (e.g., dump frame, slide frame, interchangeable attachments, sealing members, etc.) of the present invention.

In some embodiments, a lubricant can nevertheless be applied to the sliding surfaces 143 of the slide frame 104 and/or to the sliding surfaces 153 of the bearing material 152 to reduce friction and facilitate sliding of the bearing material's sliding surfaces 153 within the channels 144. For example, in embodiments that do not include bearing material or that include bearing material that is not disposed along substantially the entire length of the sliding surface, a lubricant may be at least partially disposed on at least one sliding surface to improve the sliding movement of the slide frame relative to the dump frame. But, in other embodiments, lubricant may not be needed given the friction-reducing effects of the bearing material 152.

The bearing material 152 can be a wide range of suitable materials, such as various plastics. In one embodiment, the bearing material 152 comprises an ultra-high molecular weight (UHMW) polyethylene material that is relatively long-wearing and inexpensive. Alternatively, other suitable bearing materials include polymers such as polytetrafluoroethylene (PTFE), nylon and acetal, metals such as bronze, and composite materials that may include graphite.

Figure 31:
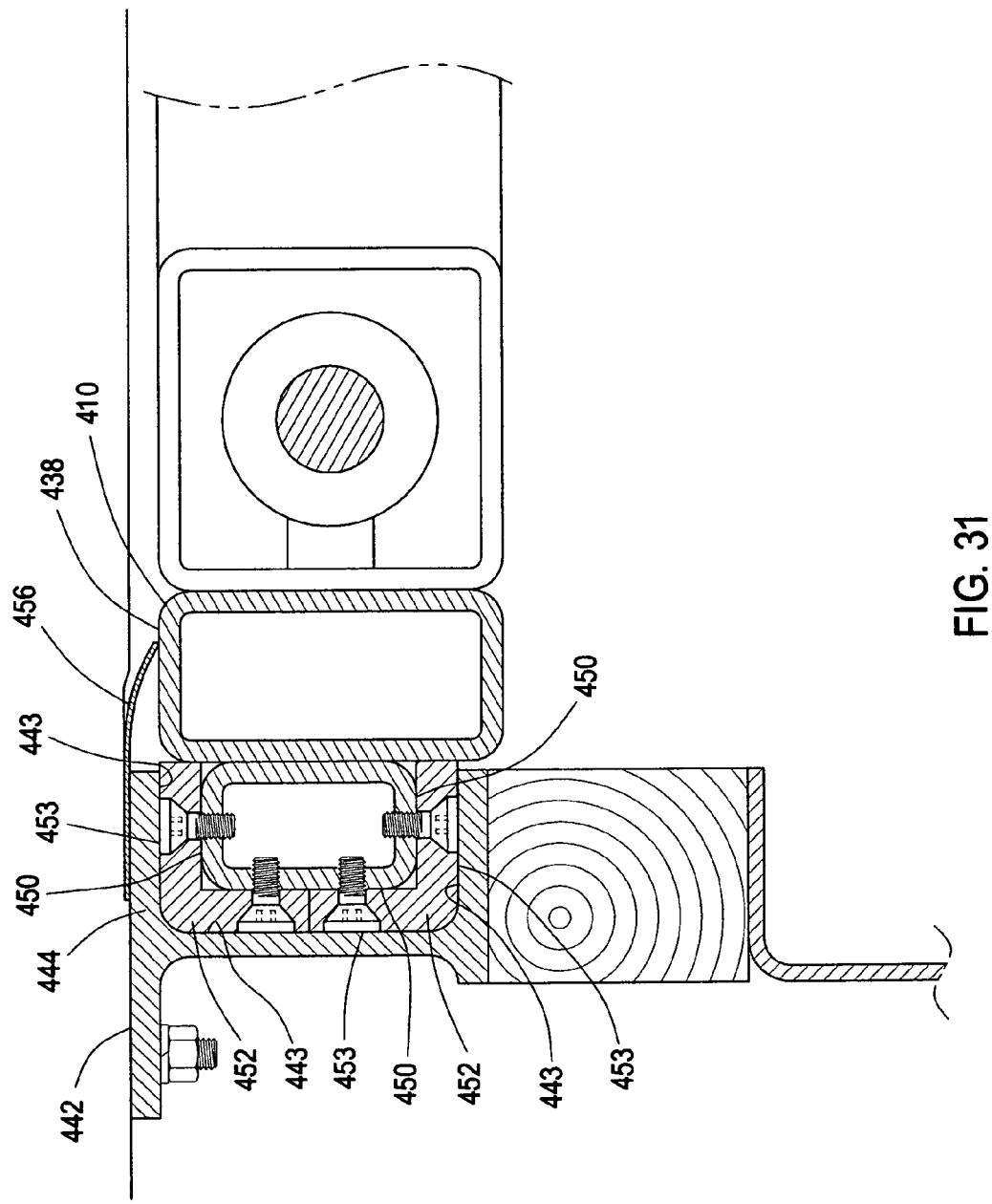
FIG. 31 is a transverse cross-sectional view of a portion of an apparatus for dumping and providing ground access according to another exemplary embodiment of the invention in which the apparatus includes at least one seal for substantially sealing an interface between the slide frame and the dump frame.

In addition (or as an alternative) to bearing material, various embodiments include a seal that substantially covers and seals an interface between sliding surfaces and/or between the dump frame and the slide frame. In this exemplary manner, the seal helps prevent foreign objects and debris from entering the interface and contacting the sliding surfaces. For example, FIG. 31 illustrates an embodiment that includes both bearing material 452 and seal 456. In this particular illustrated embodiment, the seal 456 is a resilient member that is external to the channel 444. Alternatively, the seal 456 can be made from non-resilient materials, such as sheet metal. In addition, various means can be employed to hold the seal 456 in place. By way of example, the seal 456 can be fastened to the slide frame member 442 using screws, adhesives, etc.

As shown in FIG. 31, the resilient member extends outwardly from the slide frame member 442 and at least partially across the top surface 438 of the dump frame longitudinal member 410. Accordingly, the resilient member substantially seals a top portion of an interface between the dump frame member 410 and slide frame member 442. Additionally, or attentively, a resilient member can extend generally outwardly from the slide frame member and at least partially under the bottom surface of the dump frame longitudinal member, thereby substantially sealing a bottom portion of an interface between the dump and slide frames. In these embodiments, the bearing material 452 and seal 456 cooperate to provide an effective seal that inhibits foreign objects and debris from contacting the sliding surfaces 443 and 453. Other embodiments, however, do not include bearing material, in which case, the seal 456 can still provide a sufficient seal for inhibiting foreign objects and debris from entering an interface and contacting the sliding surfaces.

Figure 32:
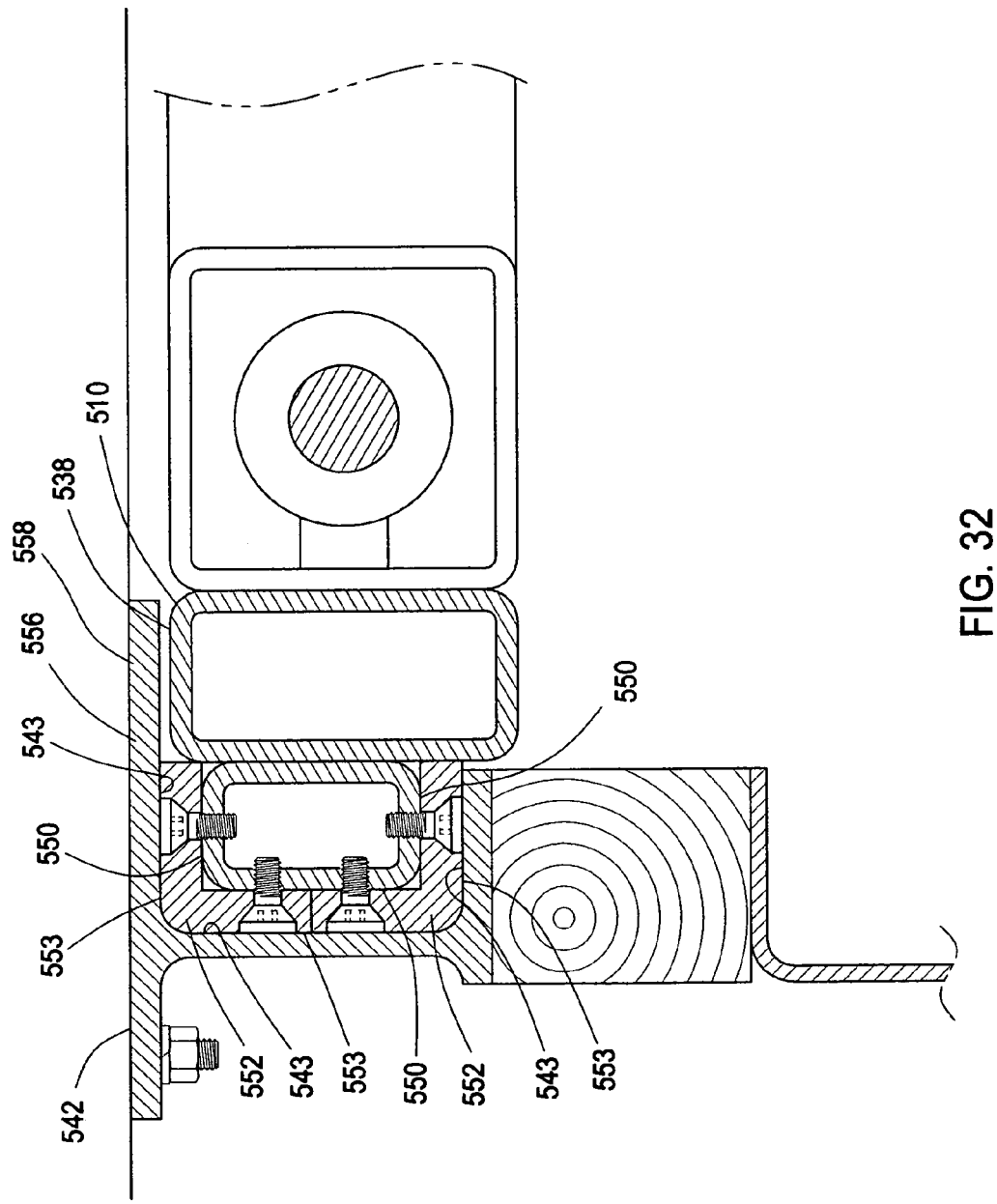
FIG. 32 is a transverse cross-sectional view of a portion of an apparatus for dumping and providing ground access according to another exemplary embodiment of the invention in which a top portion of the slide frame extends across a portion of the dump frame thereby substantially sealing an interface between the slide frame and the dump frame.

As another example, FIG. 32 illustrates an embodiment in which a seal 556 is at least partially formed by a portion 558 of the slide frame longitudinal member 542. As shown in FIG. 32, the portion 558 extends over at least a portion of the top surface 538 of the dump frame longitudinal member 510, thereby substantially sealing a top portion of an interface between the dump frame longitudinal member 510 and the slide frame longitudinal member 542. Additionally, or alternatively, a seal can also be at least partially formed by a portion of the slide frame longitudinal member 542 that extends under at least a portion of the bottom surface of the dump frame longitudinal member 510, thereby substantially sealing a bottom portion of an interface between the members 510 and 542. In these embodiments, the bearing material 552 and the slide frame longitudinal member 542 cooperate to provide an effective seal that inhibits foreign objects and debris from contacting the sliding surfaces 543 and 553. Other embodiments, however, do not include bearing material, in which case, the slide frame longitudinal member 542 can still provide a sufficient seal for inhibiting foreign objects and debris from contacting the sliding surfaces.

Referring back to FIGS. 1 through 10, the apparatus 100 further includes at least one slide frame actuator for causing sliding movement of the slide frame 108. In the illustrated embodiment, the at least one slide frame actuator comprises two hydraulic actuator cylinders 160. In other embodiments, however, the slide frame actuators can be pneumatic actuators, electrically-operated actuators, telescoping actuators, non-cylindrical actuators, etc.

While two slide frame actuators 160 are shown in the figures, any suitable number of (i.e., one or more) slide frame actuators can be used for providing the actuation power for causing sliding movement of the slide frame depending, for example, on the particular application. In addition, the hoses for connecting the slide frame actuators 160 to their power source have been removed for clarity.

In various embodiments, the slide frame actuators 160 receive power from a hydraulic pump mounted on the vehicle's engine. In another embodiment, the slide frame actuators 160 receive power from a self-contained standalone electrically driven hydraulic power unit, which may, for example, be contained within the space (generally indicated by arrow 129 in FIG. 1) defined by the vehicle's chassis 106 or at other suitable locations. Alternatively, other suitable means can be employed for providing power to the slide frame actuators 160. For example, the slide frame actuators may receive hydraulic power generated by a hydraulic pump driven off of the truck's transmission. Or, for example, a wide range of non-hydraulic power sources (e.g., electric motors in combination with gear drives, screw drives, cables and pulleys, chains and sprockets, etc.) may be used for causing the sliding movement. In addition, each slide frame actuator 160 does not need to receive its power from the same source as the other slide frame actuator and/or as the dump frame actuator 128.

As shown in FIG. 9, each slide frame actuator 160 is a hydraulic cylinder with a first end 162 connected to one of the dump frame longitudinal members 110, and a second end 164 connected to a cross member 166 of the slide frame 108. In the illustrated embodiment, the first end 162 generally refers to the base end of the corresponding hydraulic cylinder 160. The second end 164 generally refers to the end of the shaft or rod, which, in turn, is engaged with a piston (not shown) within the corresponding hydraulic cylinder 160. In other embodiments, however, the orientation of either or both of the slide frame actuators 160 may be reversed with the base end(s) pivotably mounted to the cross member 166, and the rod end(s) pivotably mounted to the dump frame longitudinal member(s) 110. Alternatively, other types of actuators (e.g., non-hydraulic actuators, pneumatic actuators, electrical actuators, non-cylindrical actuators, telescoping actuators, etc.) can also be employed with their first and second ends respectively coupled to the cross member 166 and dump frame longitudinal members 110, or vice versa.

Each slide frame actuator 160 is disposed along a substantial length of the dump frame longitudinal members 110, which allows the slide frame actuators 160 to have a relatively large stroke length. In addition, having the slide frame actuators 160 disposed on opposite sides of the slide frame 108 imparts a more well-balanced sliding movement to the slide frame 108.

Each slide frame actuator 160 is mounted to the dump frame 104 through a coupling member 168. Each coupling member 168 extends inwardly and transversely from a respective one of the longitudinal members 110. The coupling members 168 are longitudinally disposed between the front end portions 116 of the longitudinal members 110 and the middle cross member 114.

As shown in FIGS. 2 and 21, each slide frame actuator 160 extends rearwardly from the coupling member 168, through an opening 170 (FIG. 21) in the middle cross member 114 of the dump frame 104, and to the rear cross member 166 of the slide frame 108. In the illustrated embodiment, the openings 170 are generally rectangular through-holes defined by the cross member 114. Alternatively, however, other suitably configured openings beside rectangular through-holes may be employed including circular through-holes, other non-rectangular through-holes, notches, cutouts, etc.

When the slide frame actuators 160 are actuated, the slide frame actuators 160 push against the slide frame's rear cross member 166 with sufficient force to cause the slide frame 108 to slide on the dump frame 104 rearwardly away from the truck's cab 118, as shown by comparing FIG. 9 with FIG. 10.

Figure 33:
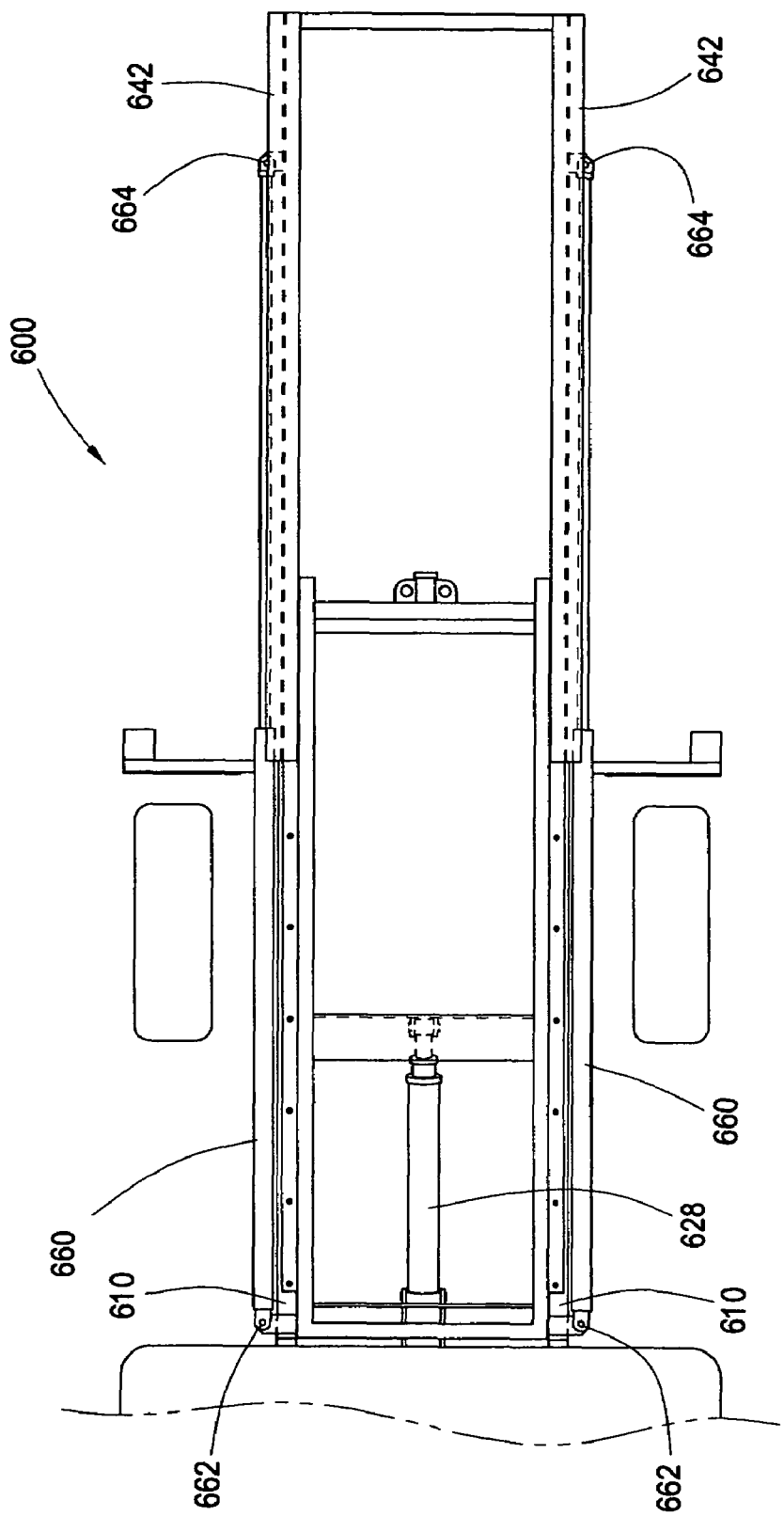
FIG. 33 is a top view of a truck having an apparatus for dumping and providing ground access according to another exemplary embodiment of the invention in which the dump frame actuator is located within the width of the chassis, but the slide frame actuators are located outside the width of the chassis.

The slide frame actuators 160 are located within the width of the chassis 106 and within the width of the dump frame 104. Alternative embodiments, however, include the slide frame actuators being located outside the width of the chassis. For example, FIG. 33 illustrates an alternative embodiment 600 in which the dump frame actuator 628 is located within the width of the vehicle chassis, but the slide frame actuators 660 are located outside the width of the vehicle chassis. Each slide frame actuator 660 has a first end 662 connected to one of the dump frame longitudinal members 610, and a second end 664 connected to one of the slide frame longitudinal members 642. Each slide frame actuator 660 is disposed along a substantial length of the dump frame longitudinal members 610. But in this particular embodiment, the slide frame actuators 660 are located outside the dump frame longitudinal members 610.

Referring to FIGS. 21 and 22, the slide frame longitudinal members 142 include a top surface 172 and a bottom surface 174 which define a height therebetween. The first and second ends 162 and 164 of each slide frame actuator 160 are vertically disposed at least partially within the height defined between the slide frame's top and bottom surfaces 172 and 174. The slide frame actuators 160 are also vertically disposed at least partially within the height defined between the dump frame's top and bottom surfaces 138 and 140. With this arrangement, the slide frame actuators 160 do not add (or add very little) to the overall height of the apparatus 100. Accordingly, this arrangement helps provide the apparatus 100 with a relatively compact and low profile structure.

Moreover, and as shown in FIG. 22, the second end 134 of the dump frame actuator 128 is also vertically disposed within the height defined between the slide frame's top and bottom surfaces 172 and 174. In addition, the dump frame actuator 128 and the slide frame actuators 160 are at least partially located in a plane that is substantially parallel to the slide plane of the slide frame 108. At least a portion of the dump frame actuator 128 and at least a portion of each slide frame actuator 160 are located in the same plane, which, in turn, is substantially parallel to a plane through which at least a portion of the slide frame 108 slides. Accordingly, the dump frame actuator 128 also does not add (or adds very little) to the overall height of the apparatus 100, thus helping to keep the size of the apparatus 100 relatively compact and low profile.

Figure 1:
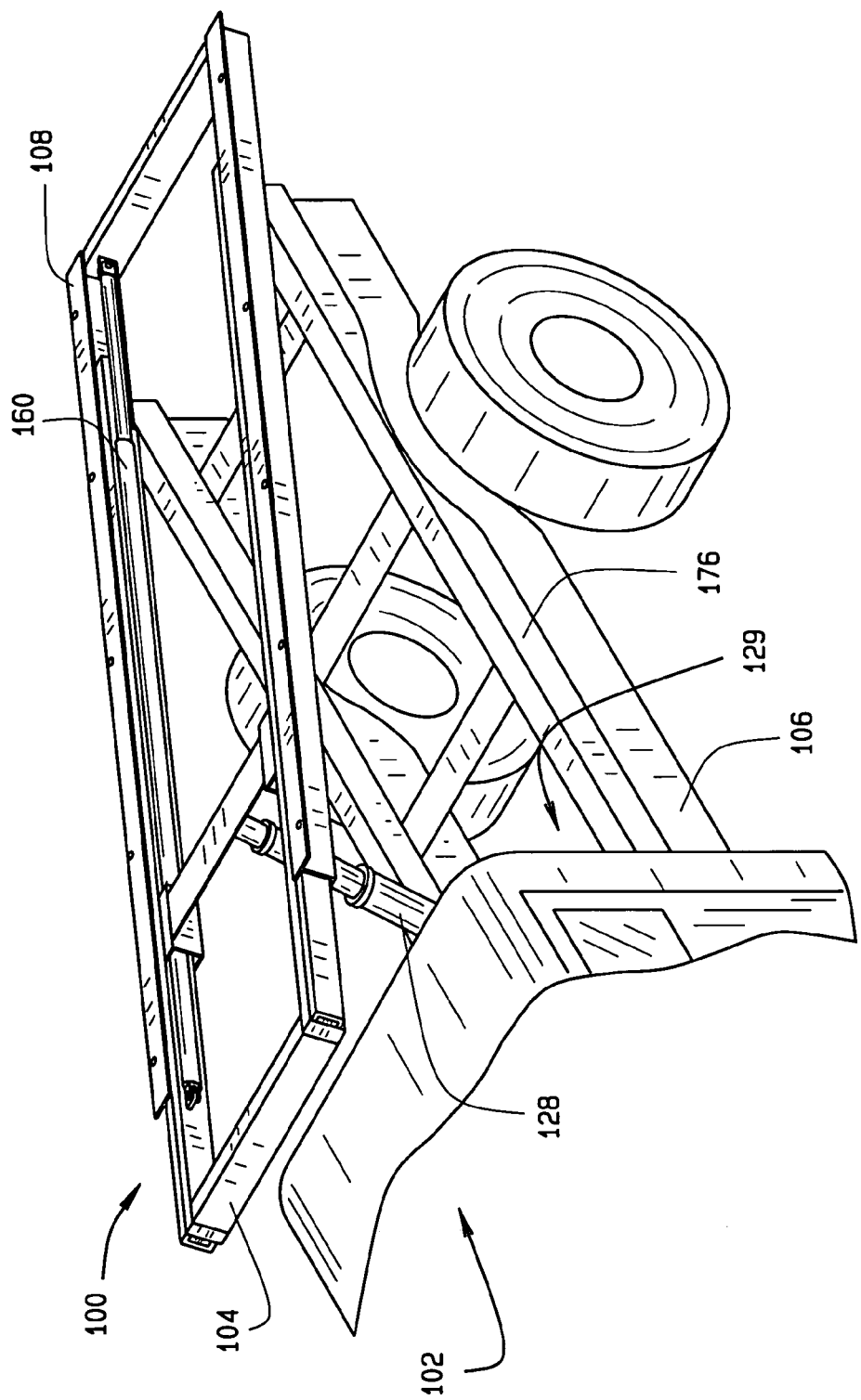
FIG. 1 is a perspective view of a truck having an apparatus for dumping and providing ground access according to one exemplary embodiment of the invention, and illustrating the apparatus in an intermediate load/dump position.

As shown in FIG. 1, the chassis 106 can also include a filler strip 176 for providing a substantially flat surface for supporting the slide frame 108. The filler strip 176 further provides a flush appearance that adds to the aesthetic appearance of the truck 102. Depending on the particular material from which the filler strip 176 is formed, the filler strip 176 can also operate as a shock absorber. In one embodiment, the filler strip 176 is formed from a hard wood such as oak. Alternatively, a wide range of other materials can be used for the filler strip 176 including various plastics, hard rubber, or composite materials.

With reference now to FIGS. 11 through 20, a load-carrying platform can be removably attached (e.g., bolted, etc.) onto the slide frame 108. In the illustrated embodiment, the load-carrying platform comprises a bed 178 that is bolted to the upper portion of the slide frame's longitudinal members 142. The bed 178, however, is shown for purposes of illustration only and not for purposes of limitation as a wide range of other suitable load-carrying platforms can also be employed. In addition to load-carrying platforms, a wide range of other interchangeable attachments can also be provided each of which is removably attachable to the slide frame 108. This can further enhance the functionality and utility of the truck 102 having the apparatus 100. Exemplary load-carrying attachments that can be attached to the apparatus 100 include a boom, a fork lift attachment, an attachment (e.g., hook, pointed rod, etc.) for picking up hay bales, etc.

These particular aspects of the invention relating to interchangeable attachments (as can all other aspects of the invention) can be used individually or in combination with any one or more of the other aspects (e.g., dump frame, slide frame, sealing members, full-length replaceable wear pads, etc.) of the present invention.

Figure 11:
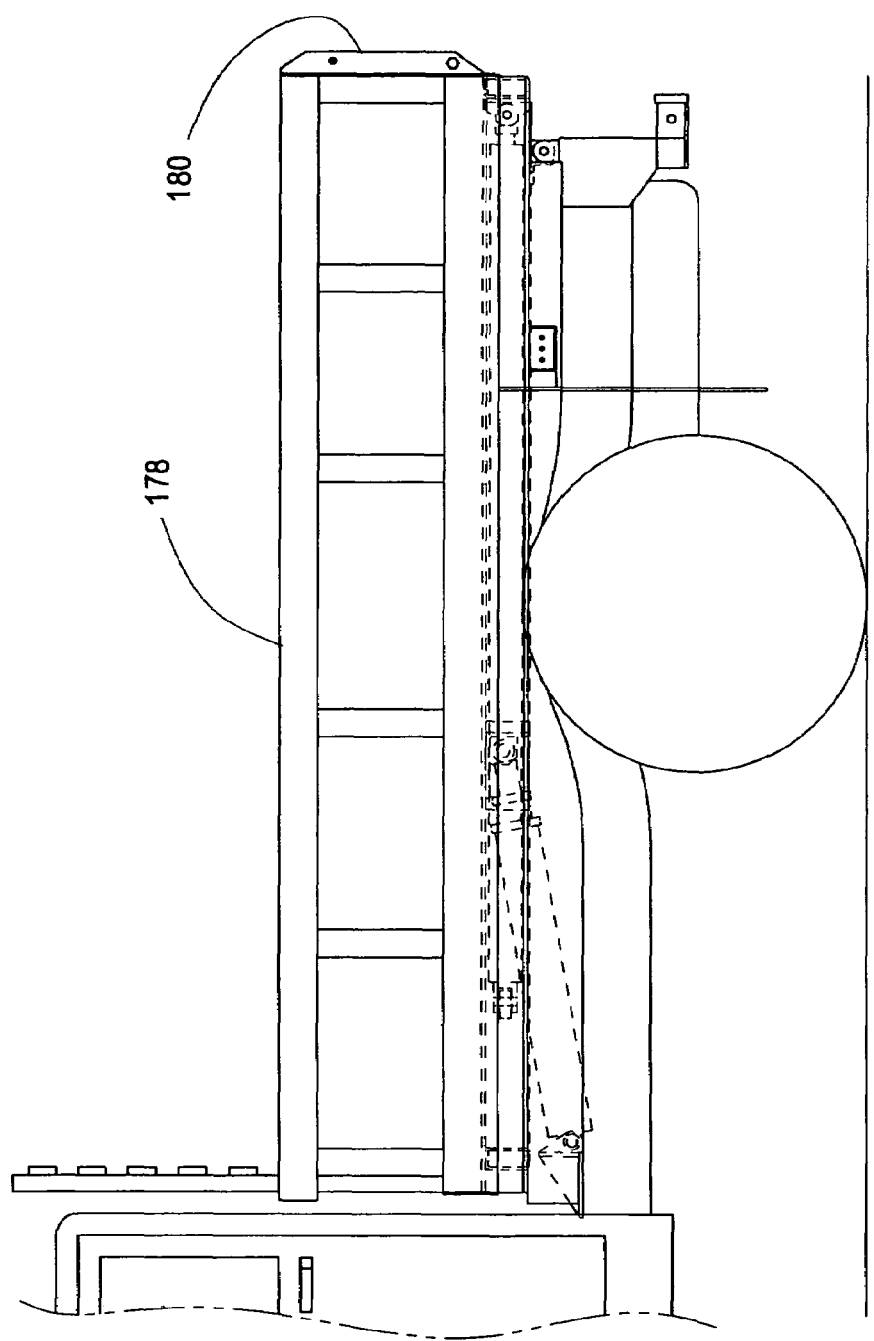
FIG. 11 is a side view of the truck shown in FIG. 1 wherein the truck includes a bed shown in the transport position.
Figure 12:
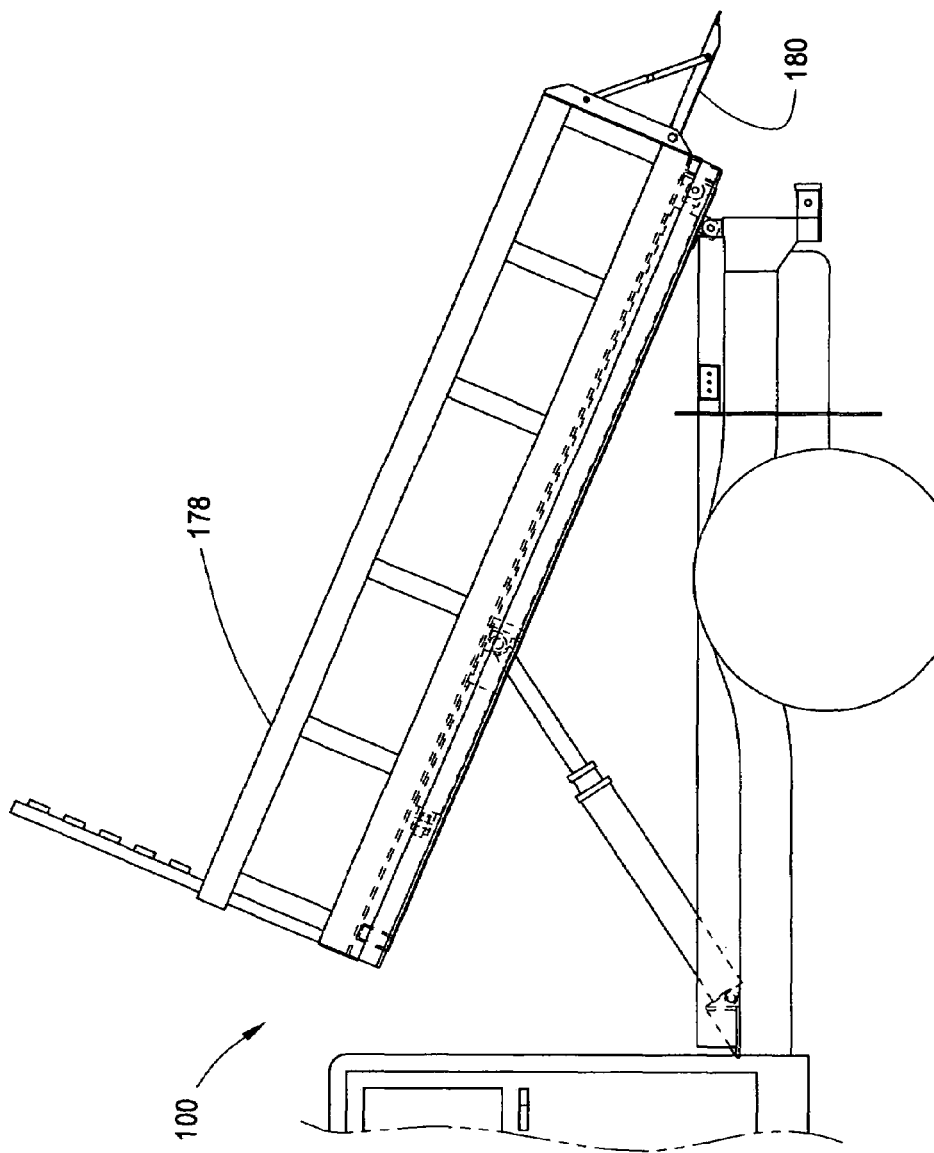
FIG. 12 is a side view of the truck shown in FIG. 11 and illustrating the bed in an intermediate dump position.
Figure 13:
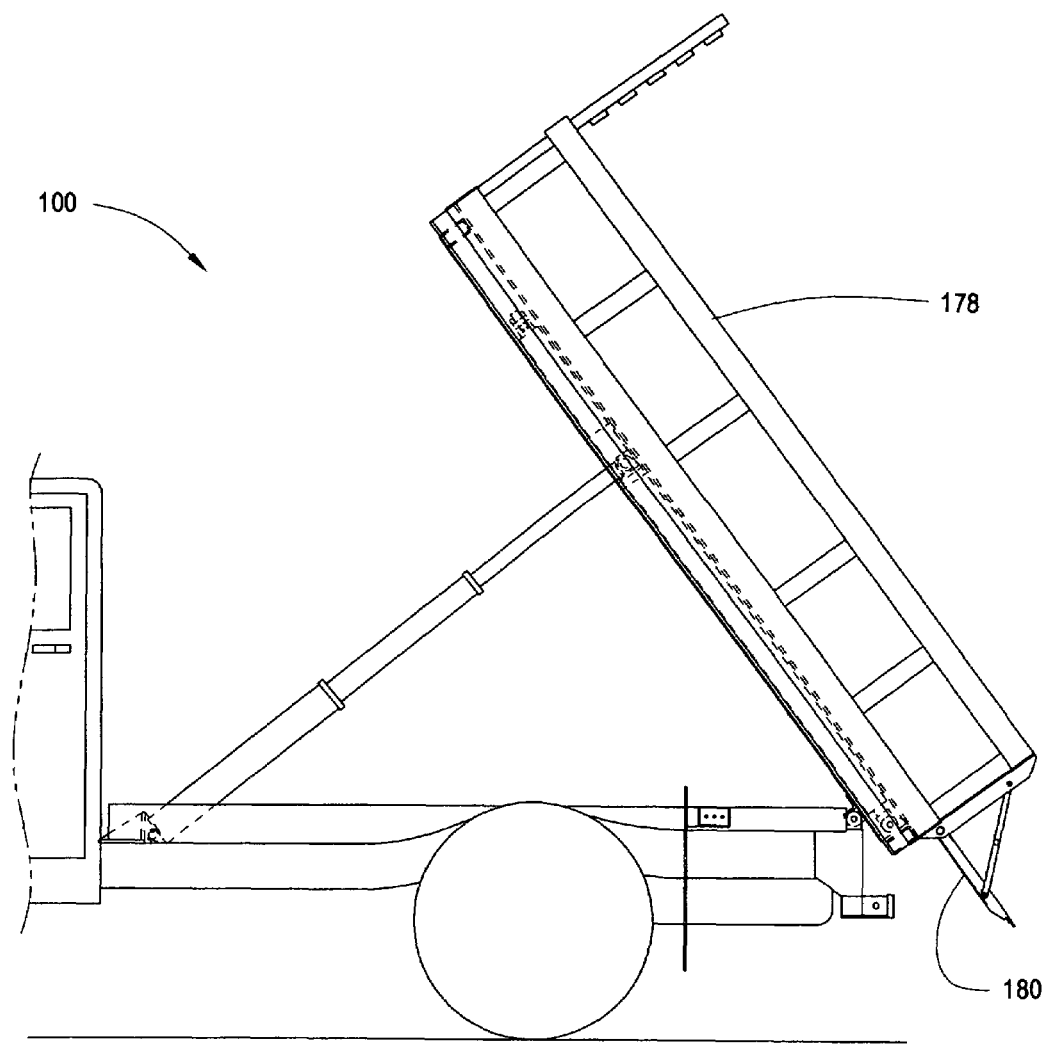
FIG. 13 is a side view of the truck shown in FIG. 11 and illustrating the bed in a dump position.
Figure 14:
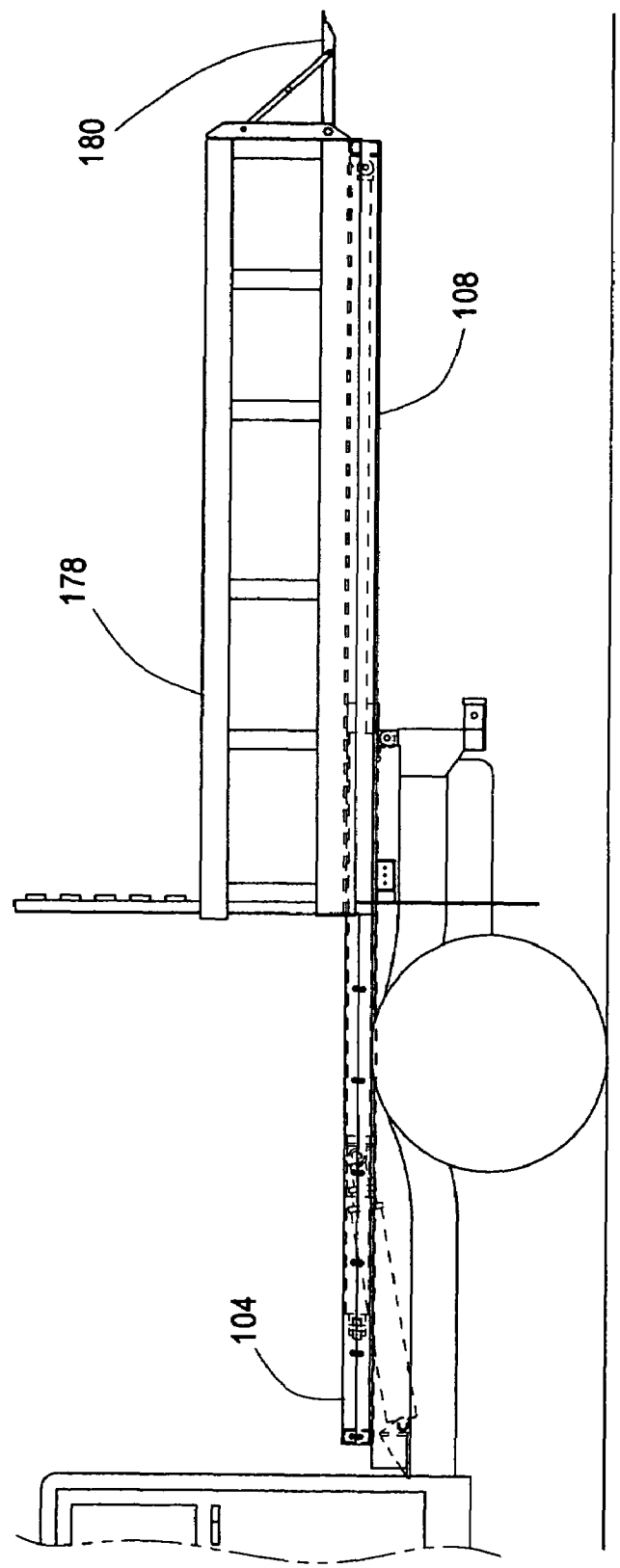
FIG. 14 is a side view of the truck shown in FIG. 11 and illustrating the bed in a slidably extended position.
Figure 15:
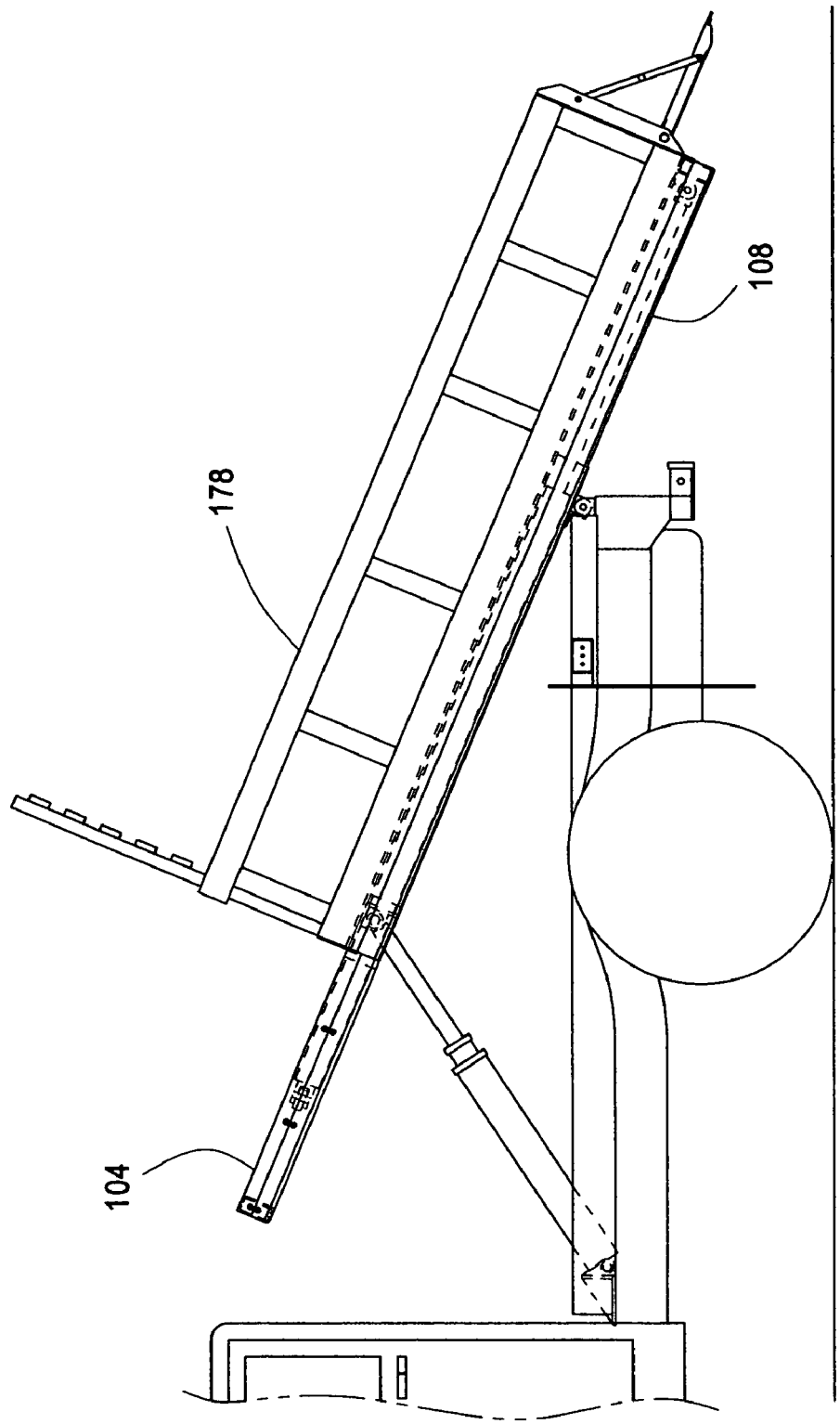
FIG. 15 is a side view of the truck shown in FIG. 11 and illustrating the bed in an intermediate load/dump position.
Figure 16:
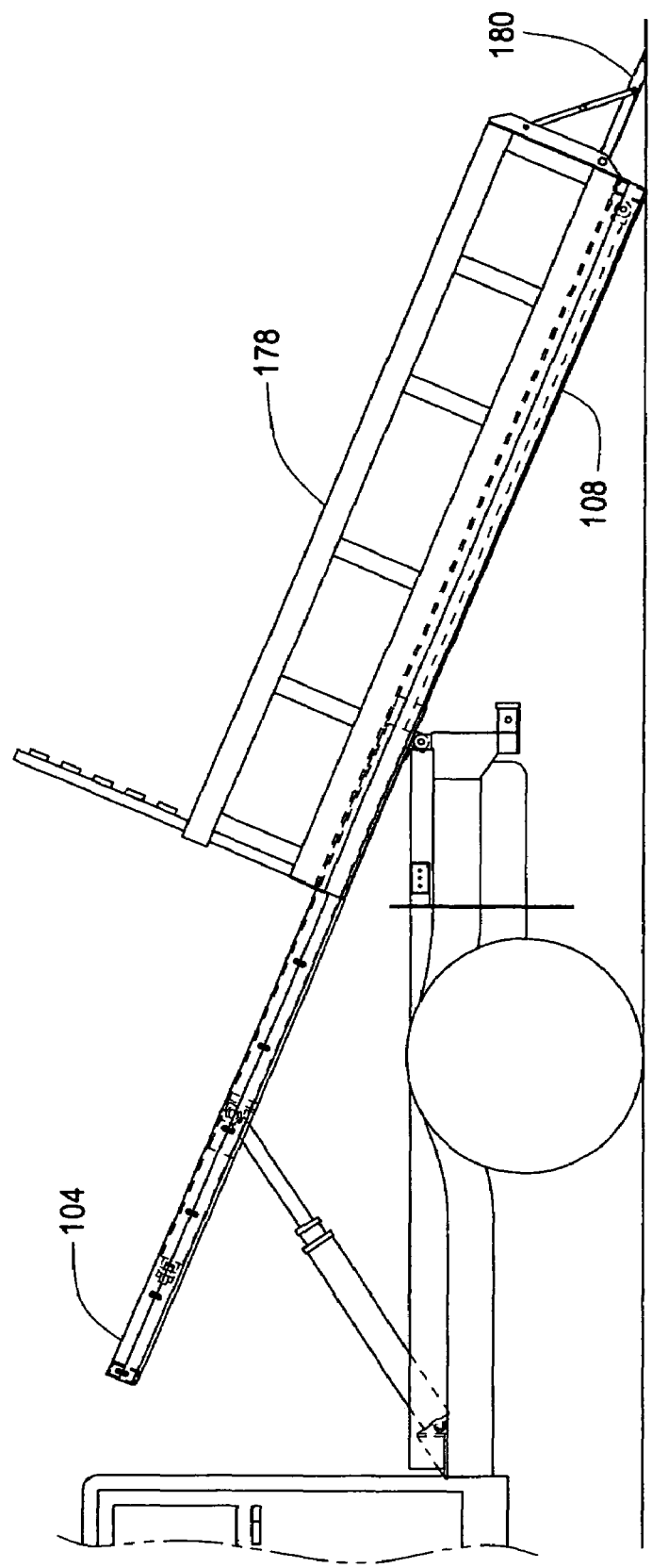
FIG. 16 is a side view of the truck shown in FIG. 11 and illustrating the bed in a load position.
Figure 17:
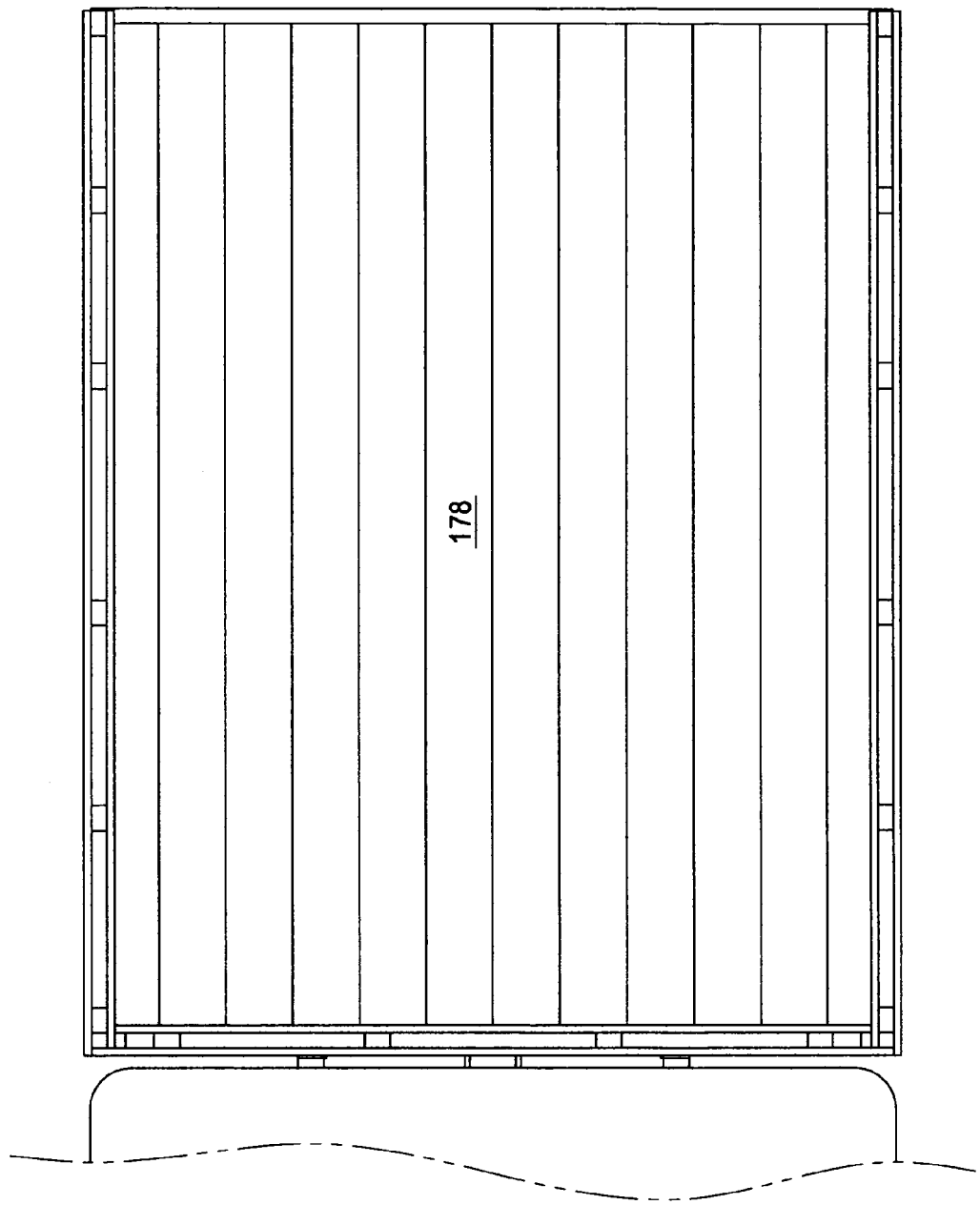
FIG. 17 is a top view of the truck shown in FIG. 11 an illustrating the bed in a transport position.
Figure 18:
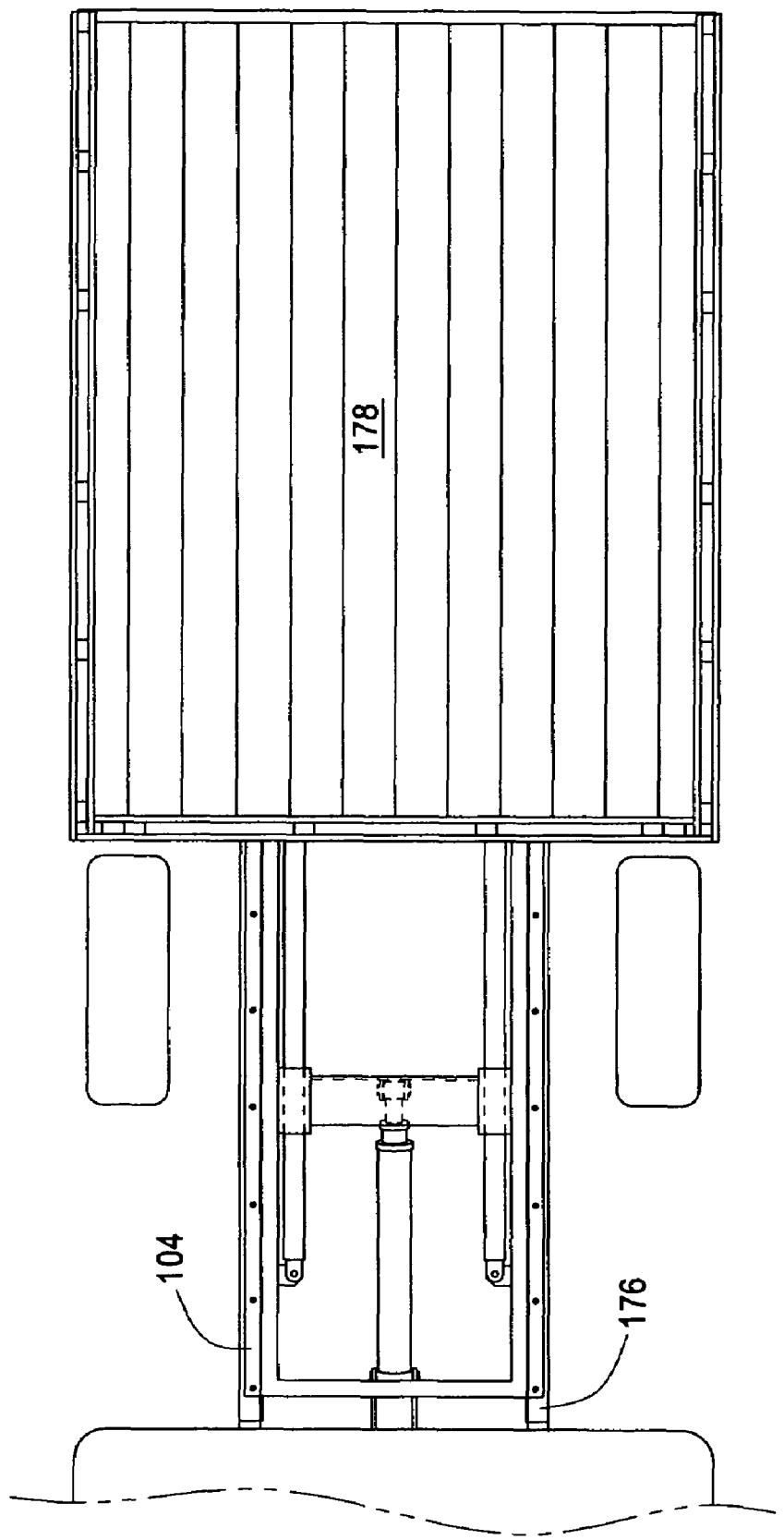
FIG. 18 is a top view of the truck shown in FIG. 11 and illustrating the bed in a slidably extended position.

As shown by comparing FIG. 11 with FIG. 14, the bed 178 is movable along with the slide frame 108. The bed 178 includes a tailgate 180. The tailgate 180 when opened (FIG. 16) allows easier ground access to the bed 178. But when the tailgate 180 is closed (FIG. 11), the tailgate 180 helps retain a load within the bed 178.

Figure 20:
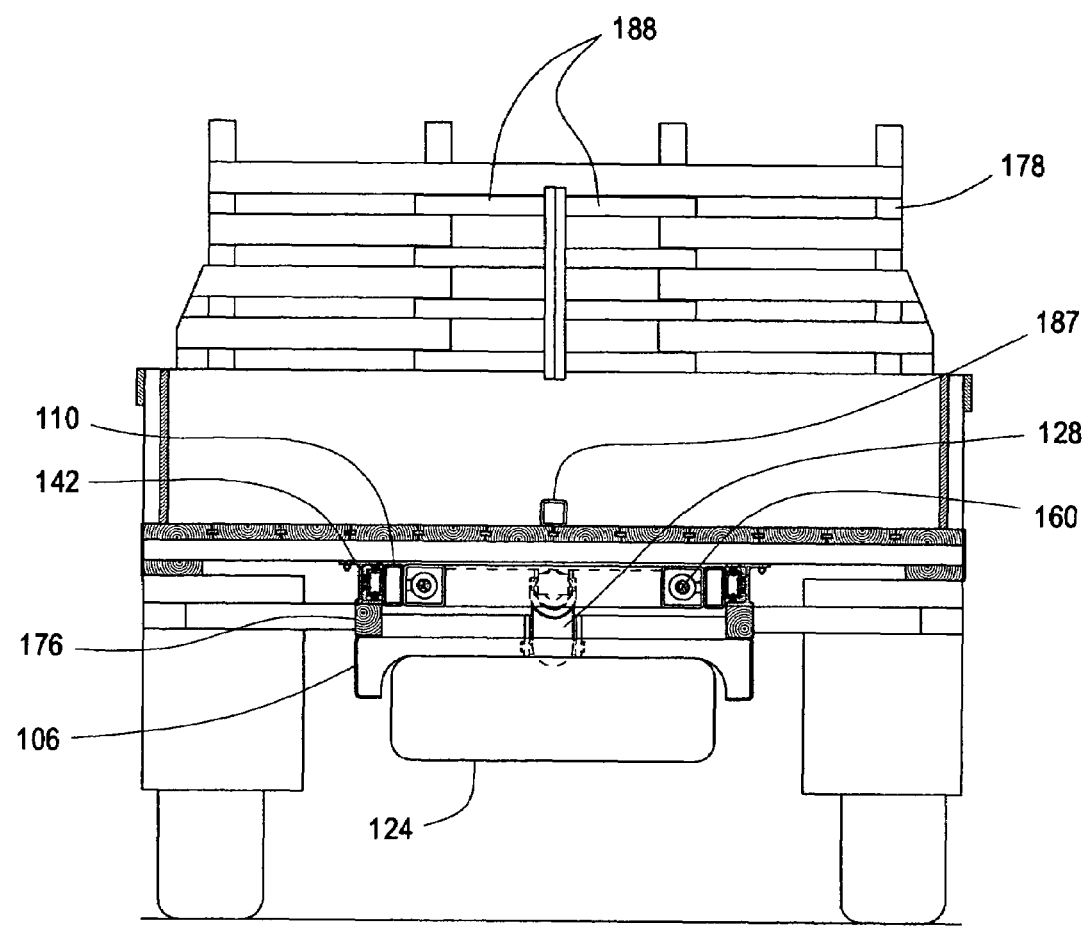
FIG. 20 is a rear transverse cross-sectional view of the truck shown in FIG. 11.

As shown in FIGS. 20 through 22, the bed 178 is supported by the slide frame 108 and the chassis 106 without the dump frame 104 having to support the bed 178 or the load carried by the bed 178 when the apparatus 100 is in the transport position. A clearance or gap 182 (FIGS. 21 and 22) separates the top surface 138 of the dump frame 104 from the bed cross member 184. The bed cross member 184 is supported on the top surface 172 of the slide frame 108, which, in turn, is supported by the chassis 106 through filler strip 176.

Figure 19:
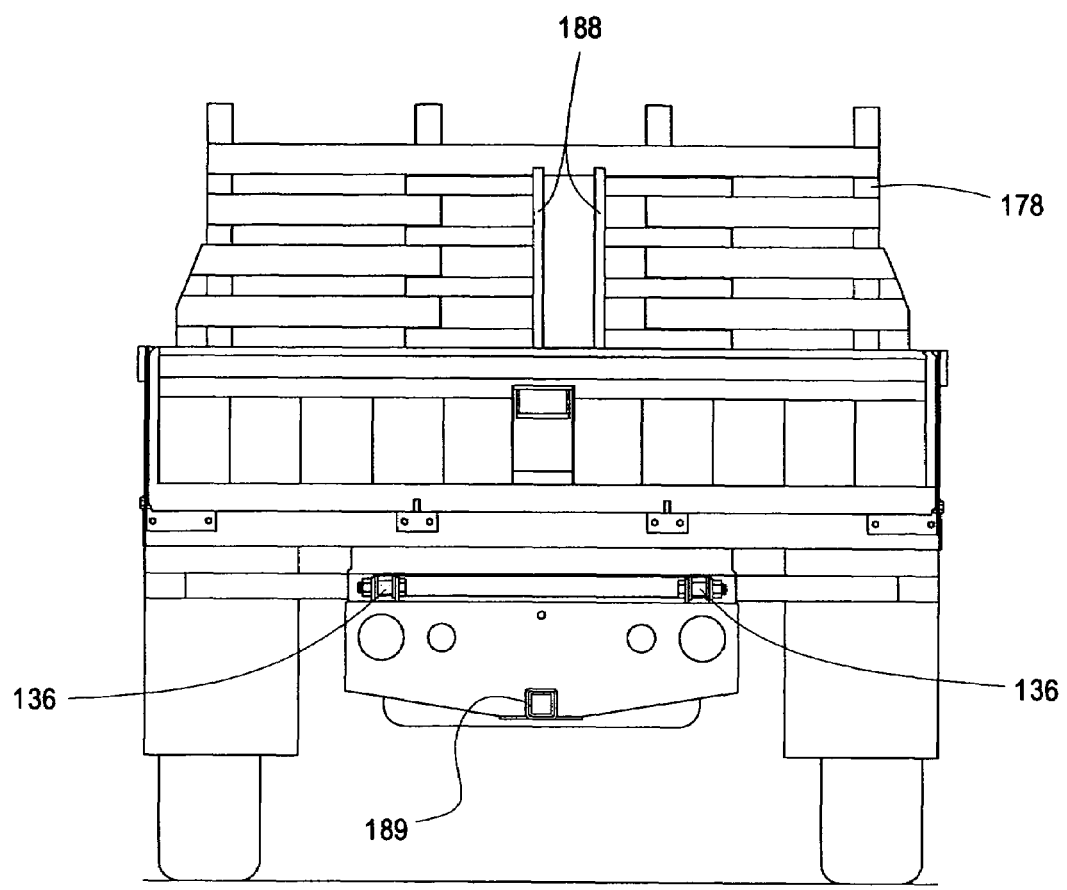
FIG. 19 is rear view of the truck shown in FIG. 11 and illustrating the bed in a transport portion.
Figure 23:
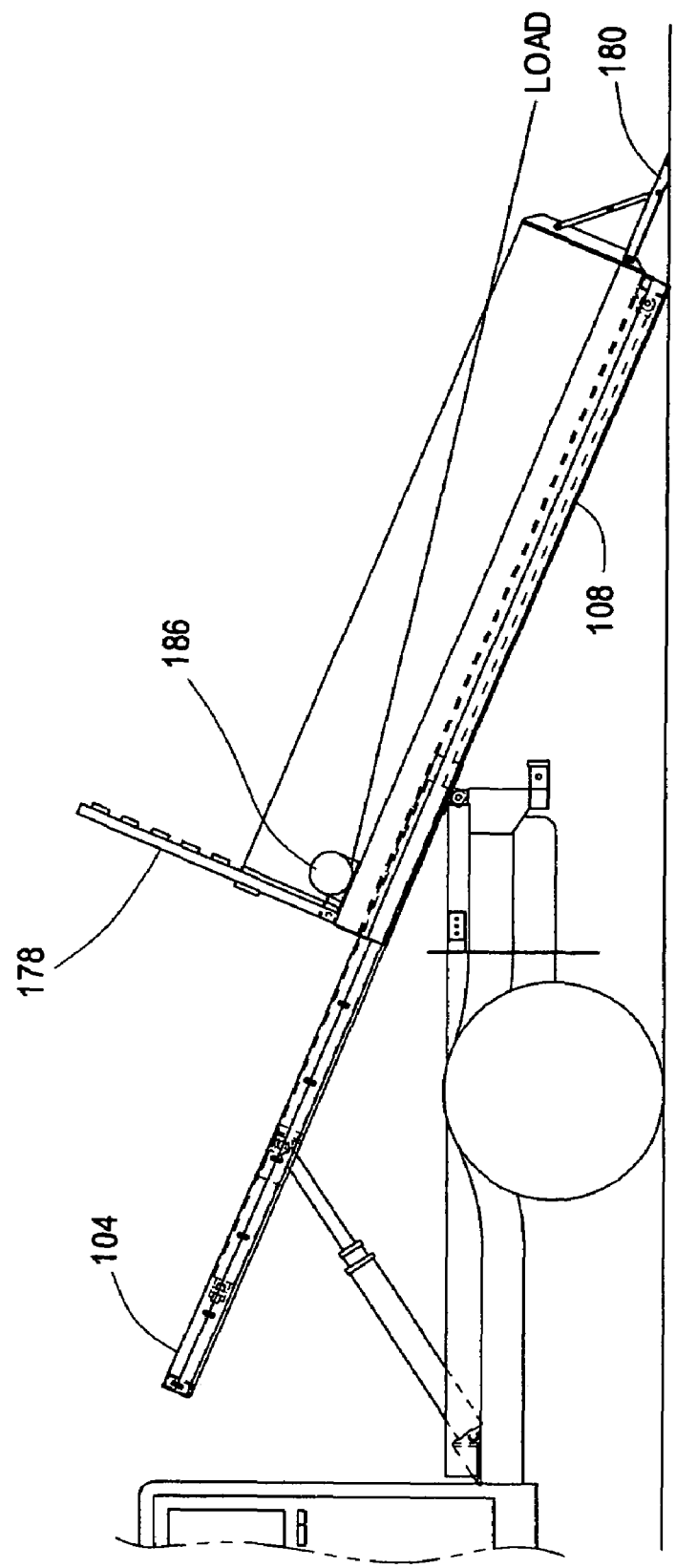
FIG. 23 is a side view of a truck having a bed (with one side rail removed for clarity), a bed-mounted winch, and an apparatus for dumping and providing ground access according to one exemplary embodiment of the invention, and illustrating the apparatus and bed in a load position.

As shown in FIG. 23, the bed 178 includes a winch 186 to facilitate loading and unloading of a load (e.g., cargo, goods, motorcycle, four-wheel all terrain vehicle, riding lawn mower, etc.) onto/off the bed 178. The winch 186 is preferably attached so that it may be removed from the bed 178 when the winch 186 is not in use. As shown in FIGS. 20 and 21, a receiver 187 is provided at the front of the bed 178 along with an electrical power outlet for the winch 186. The receiver 187 can be similar to the truck's tow hitch receiver 189 (FIG. 19). The truck may also be similarly equipped to mount the winch 186 in a tow hitch receiver 189 at the rear and/or front of the vehicle. Also, in those embodiments in which both the slide and dump mechanisms are contained within the chassis 106, there is provided useable space on the outside of the chassis 106 below the bed 178 for tool boxes or storage boxes, among other items. For example, one such storage box can be used for storing the winch 186 when the winch 186 is not being used.

In addition, the bed 178 also includes slidable portions 188 that are positioned adjacent an openable portion of a rear window of the cab 118. The portions 188 can be opened (FIG. 19) by slidably moving the portions 188 away from one another, for example, to allow a person within the cab 118 to access the bed 178 through the cab's rear window. The portions 188 can be closed (FIG. 20) by slidably moving the portions 188 towards one another, for example, to help protect the cab's rear window from a load within the bed 178.

Figure 8:
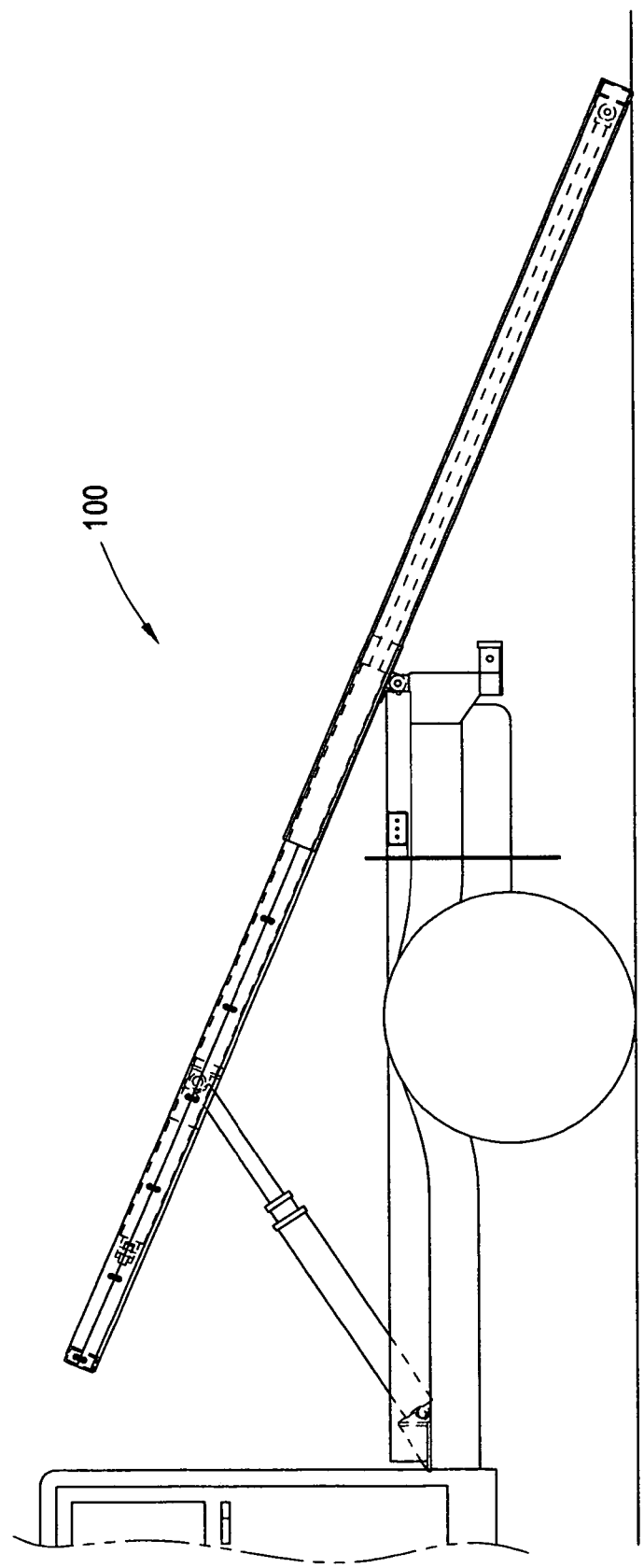
FIG. 8 is a side view of the truck shown in FIG. 1 and illustrating the apparatus in a load position.

The apparatus 100 can be positioned in various positions, including but not limited to a transport position (FIG. 3), an intermediate dump position (FIG. 4), a dump position (FIG. 5), a slidably extended position (FIG. 6), an intermediate load/dump position (FIG. 7), and a load position (FIG. 8). The apparatus 100 can also be configured for pivotal movement to dumping angles greater than what is shown in the figures depending, for example, on the particular application. In addition, the sliding movement can occur before, after, or during the pivoting movement depending on the particular operation for which the apparatus 100 is being used.

To allow an operator to selectively move the apparatus 100 into a particular position, a wide range of switching mechanisms may be employed. In the illustrated embodiment, a switching device 190 (FIG. 3) is externally mounted to the chassis 106 on the driver side of the truck 102. A switching device can also or instead be mounted on the passenger side of the truck 102. In various embodiments, the external switching device does not include an on/off power switch, but instead this on/off switching is controlled by a switching device within the cab. The switching device may be electrical, hydraulic, or any other type or combination thereof depending on the type of actuators and type of power used.

As shown in FIG. 3, the switching device 190 includes three switches: a switch for switchably controlling the sliding movement, a switch for switchably controlling the pivoting movement, and a switch for switchably controlling an attachment such as the winch 186. Alternatively, the switching device 190 can include more or less switches in any other suitable configuration. Additionally, or alternatively, a switching device may also be provided within the cab 118 to allow a person within the cab 118 to control operation of the apparatus 100. As yet another example, the apparatus 100 can additionally or alternatively be configured such that its operation can be remotely controlled by an external transmitter or remote control device. In such embodiment, the apparatus 100 can be operatively associated with a controller capable of receiving signals from a remote control device (e.g., wireless signals communicated between antennae, electromagnetic wave energy, cellular phone, RF energy or radio transmissions, infrared, etc.). Signals received by the controller can then provide information to the controller for causing the controller to selectively operate the dump frame actuator 128 and slide frame actuators 160 in accordance with the particular selection made by the operator.

In various embodiments, the apparatus 100 is configured to be bolted onto the truck chassis 106. With this bolting arrangement, embodiments of the apparatus 100 can be readily retrofit onto existing trucks of various sizes and types.

Figure 24A:
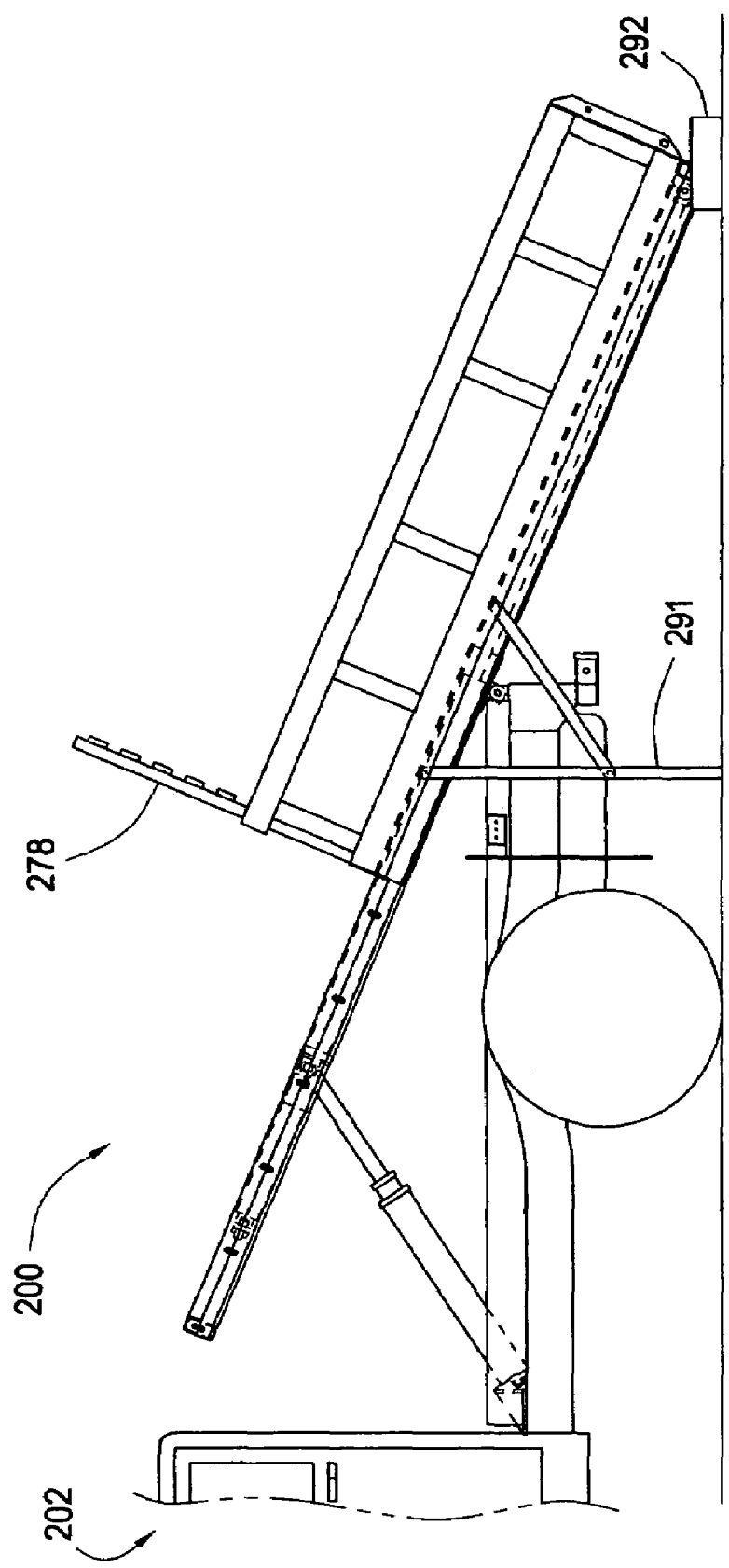
FIGS. 24A and 24B are side views of the truck shown in FIG. 11 illustrating an exemplary manner by which the bed can be removed from and attached to the dump/slide apparatus.
Figure 24B:
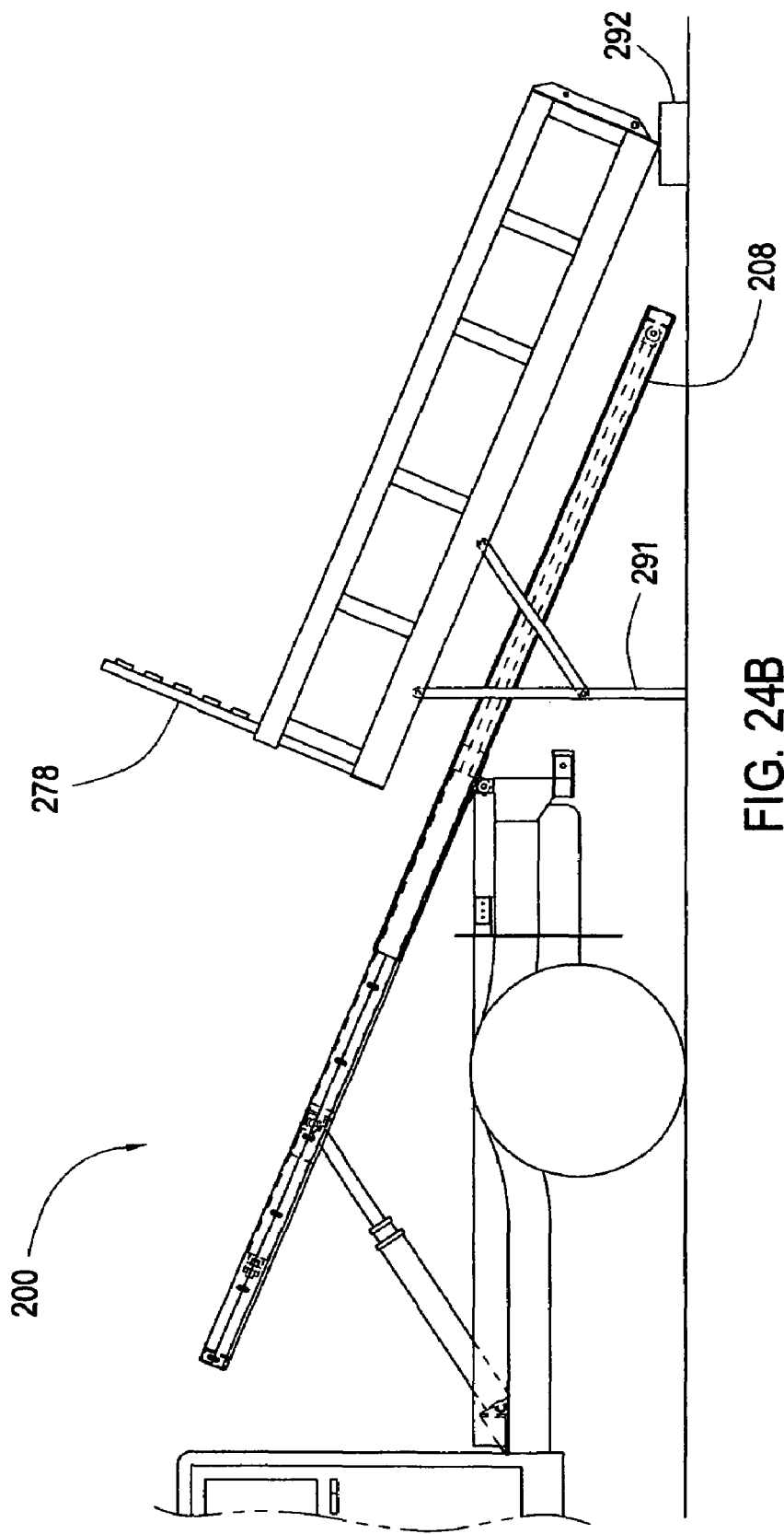

FIGS. 24A and 24B illustrate another embodiment of bed 278 that can be used with an apparatus 200 of the present invention. In this particular embodiment, the bed 278 includes a support 291 on each of the passenger and driver sides of the bed 278. These supports 291 can be extended to help support the bed 278 for removal from, and attachment to the truck 202. As shown in FIG. 24A, a pair of supports 292 can be positioned under a rear end portion of the bed 278, and the supports 291 can be extended. As shown in FIG. 24B, the bed 278 can then be detached from the slide frame 208. At which point, the truck 202 can be driven away without the bed 278 as the bed 278 remains supported by the supports 291 and 292. In various embodiments, the supports may include one or more wheels for rolling on the ground. In such embodiments, the wheeled supports can help support the bed, for example, to facilitate moving the bed when it is detached from the truck. In yet other embodiments, the supports may be separate components that are not fastened to the bed. As described above, a wide range of interchangeable attachments (e.g., a boom, a fork lift attachment, an attachment for picking up hay bales, etc.) can be provided each of which is removably attachable to the slide frame. Any of the attachments can also include supports that can be extended to help support the interchangeable attachment for removal from, and engagement to the truck.

FIGS. 25 through 30 illustrate another embodiment of an apparatus 300 in which the actuation power for causing pivotal movement is provided by a dump frame actuator 328 coupled to a linkage or scissors 394. The combination of a dump frame actuator and scissors is commonly referred to as a scissors hoist.

In the illustrated embodiment, the dump frame actuator 328 is a non-telescoping hydraulic cylinder. In other embodiments, however, the dump frame actuator 328 can be a pneumatic actuator, an electrical actuator, a non-cylindrical actuator, a telescoping actuator, among other suitable actuation devices.

While only one dump frame actuator 328 is shown in FIGS. 25 through 30, alternative embodiments include a plurality of dump frame actuators that cooperate to provide the actuation power for pivotably moving the dump frame relative to the chassis. In addition, the hoses for connecting the dump frame actuator 328 to its power source have been removed for clarity.

In various embodiments, the dump frame actuator 328 receives power from a hydraulic pump mounted on the vehicle's engine. In another embodiment, the dump frame actuator 328 receives its power from a self-contained standalone electrically driven hydraulic power unit, which may, for example, be contained within a space (generally indicated by arrow 329 in FIGS. 25 and 28) defined by the vehicle's chassis 306 or at other suitable locations. Attentively, other suitable means can be employed for providing power to the dump frame actuator 328. For example, the dump frame actuator 328 may receive hydraulic power generated by a hydraulic pump driven off of the truck's transmission. Or, for example, a wide range of non-hydraulic power sources (e.g., electric motors in combination with gear drives, screw drives, cables and pulleys, chains and sprockets, etc.) may be used for causing the dumping pivotal movement.

Figure 29:
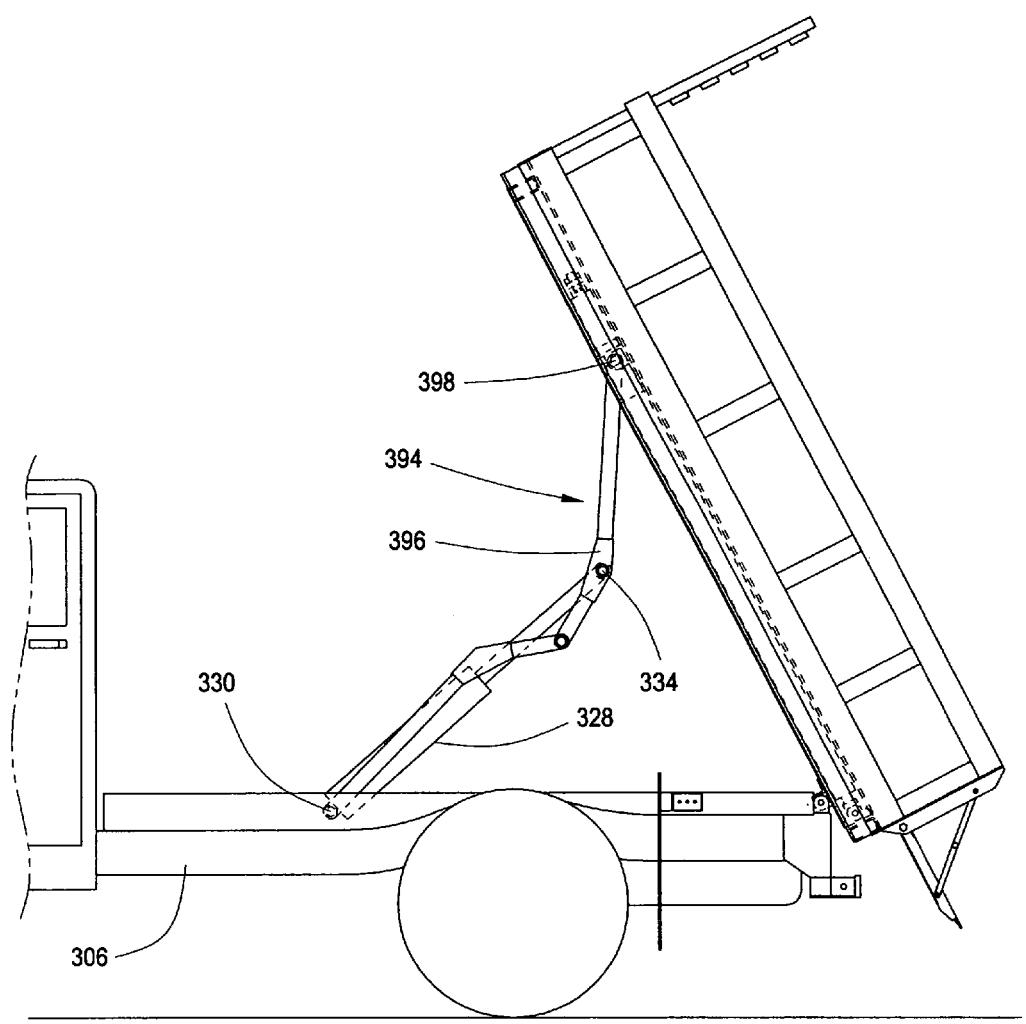
FIG. 29 is a side view of the truck shown in FIG. 27 and illustrating the bed in a dump position.
Figure 30:
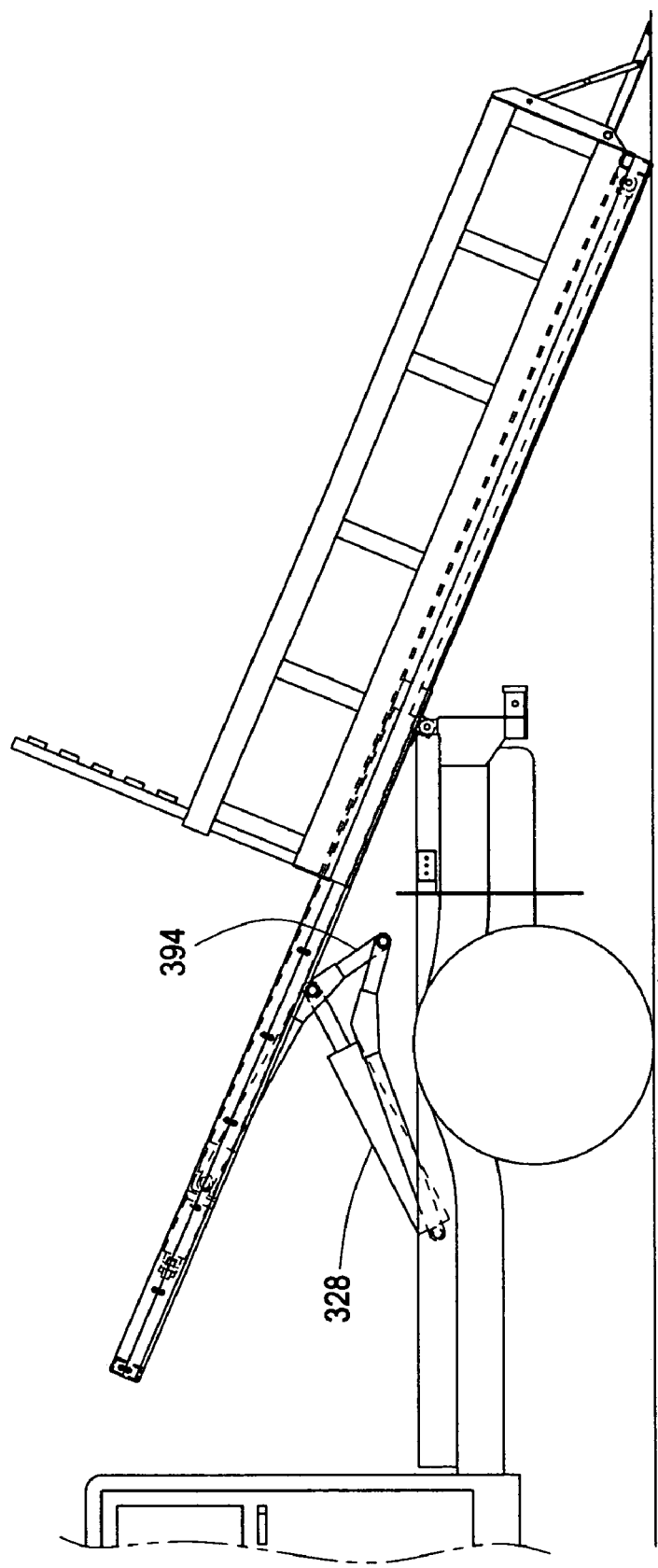
FIG. 30 is a side view of the truck shown in FIG. 27 and illustrating the bed in a load position.

As shown in FIG. 29, the dump frame actuator 328 is a non-telescoping hydraulic cylinder with a first end 330 pivotably coupled to the truck chassis 306, and a second end 334 pivotably coupled to a member 396 of the scissors 394. In the illustrated embodiment, the first end 330 generally refers to the base end of the hydraulic cylinder 328. The second end 334 generally refers to the end of the shaft or rod, which, in turn, is engaged with a piston (not shown) within the hydraulic cylinder 328. In other embodiments, however, the first and second ends 330 and 334 may be reversed such that the base end of the actuator cylinder is pivotably coupled to the scissors, and the rod end is pivotably coupled to the vehicle chassis. Yet other embodiments include a dump frame actuator that is not directly connected to the scissors, but instead the dump frame actuator is connected to the dump frame at a different location than the location at which the scissors is connected to the dump frame. In still further embodiments, other types of actuators (e.g., non-hydraulic actuators, pneumatic actuators, electrical actuators, non-cylindrical actuators, telescoping actuators, etc.) can be employed with their first and second ends coupled to the scissors and chassis (or vice versa) or coupled to the dump frame and chassis (or vice versa).

Figure 25:
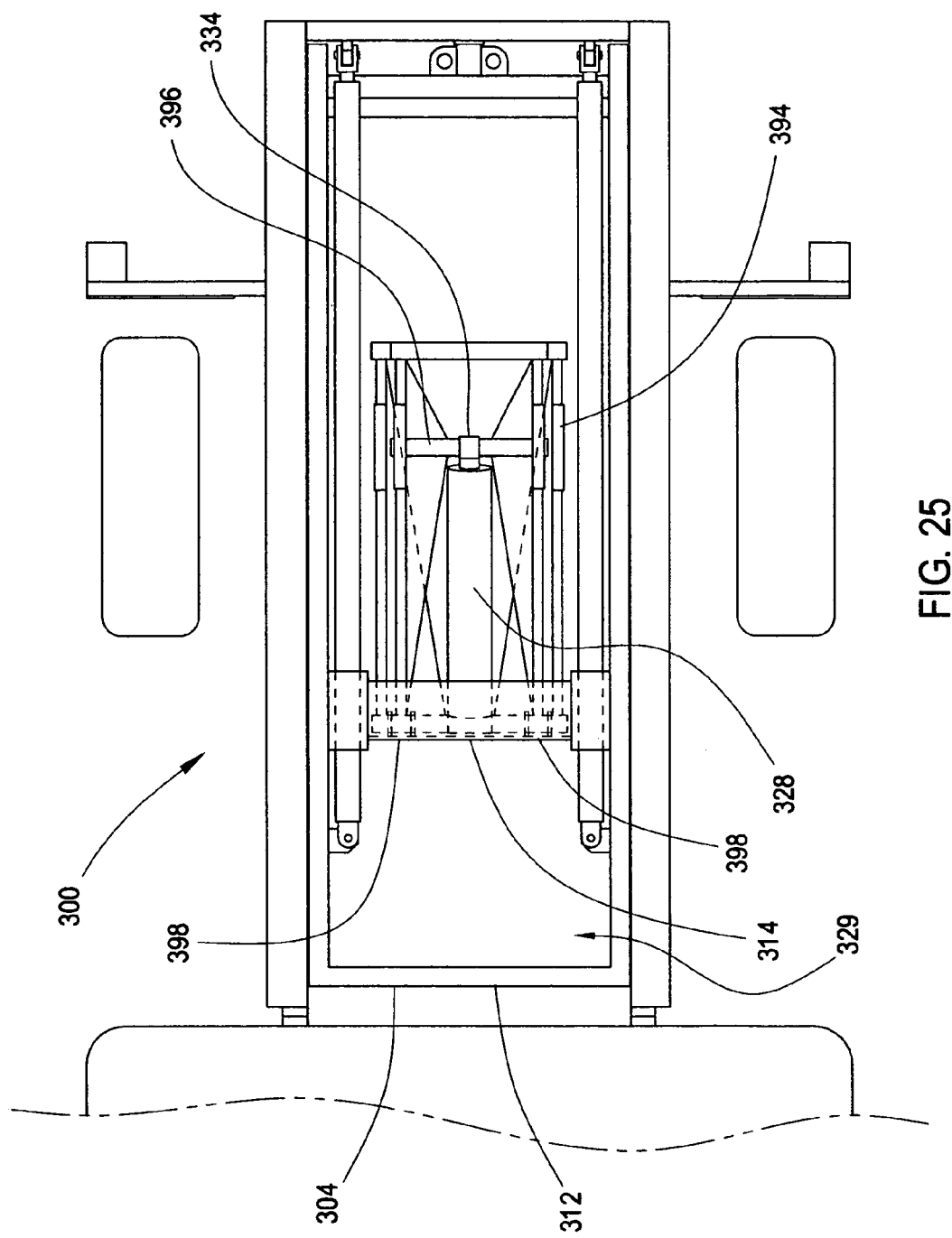
FIG. 25 is a top view of a truck having an apparatus for dumping and providing ground access that includes a scissors hoist according to another exemplary embodiment of the invention, and illustrating the apparatus in a transport position.
Figure 26:
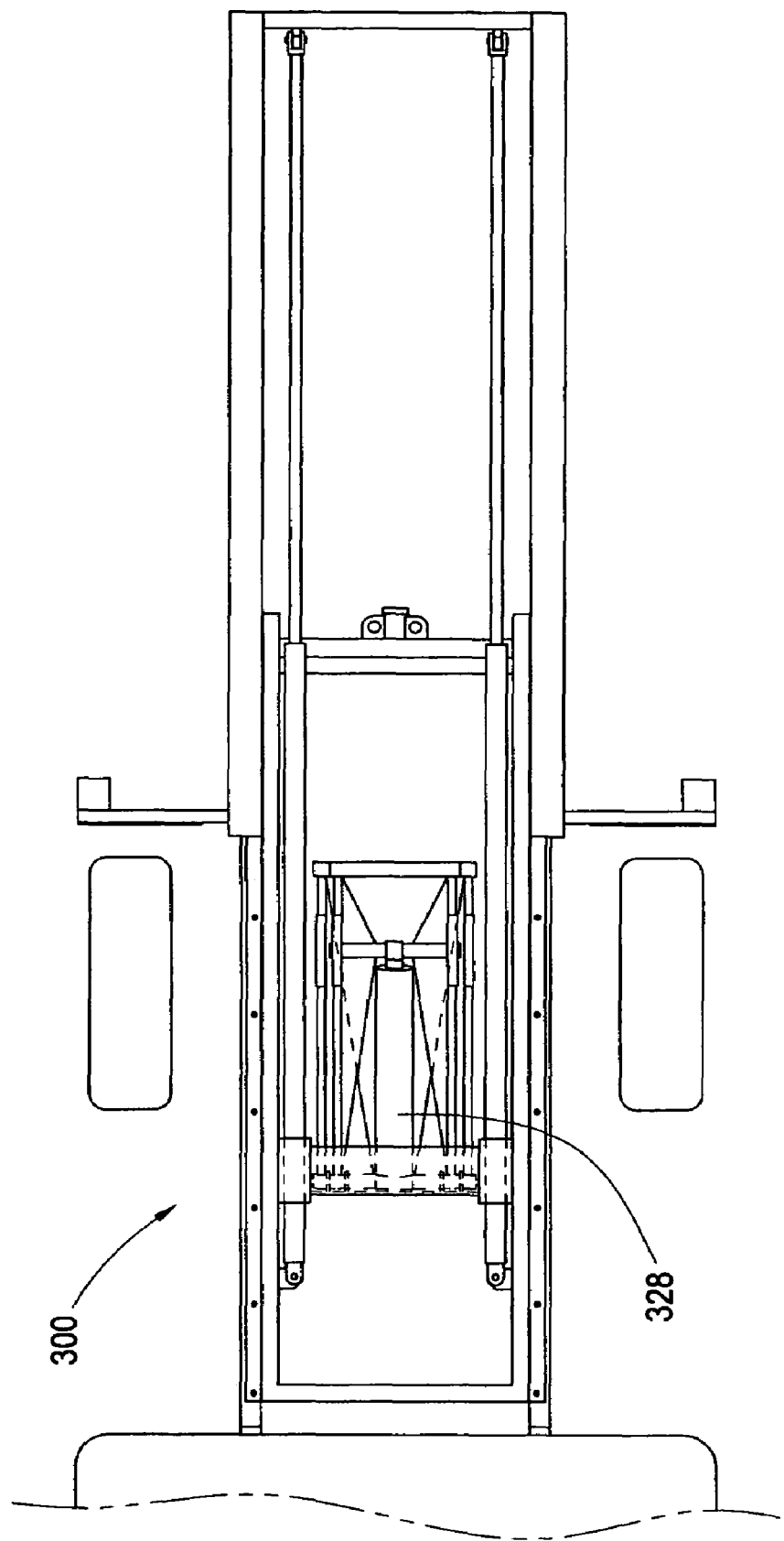
FIG. 26 is a top view of the truck shown in FIG. 25 and illustrating the apparatus in a slidably extended position.
Figure 27:
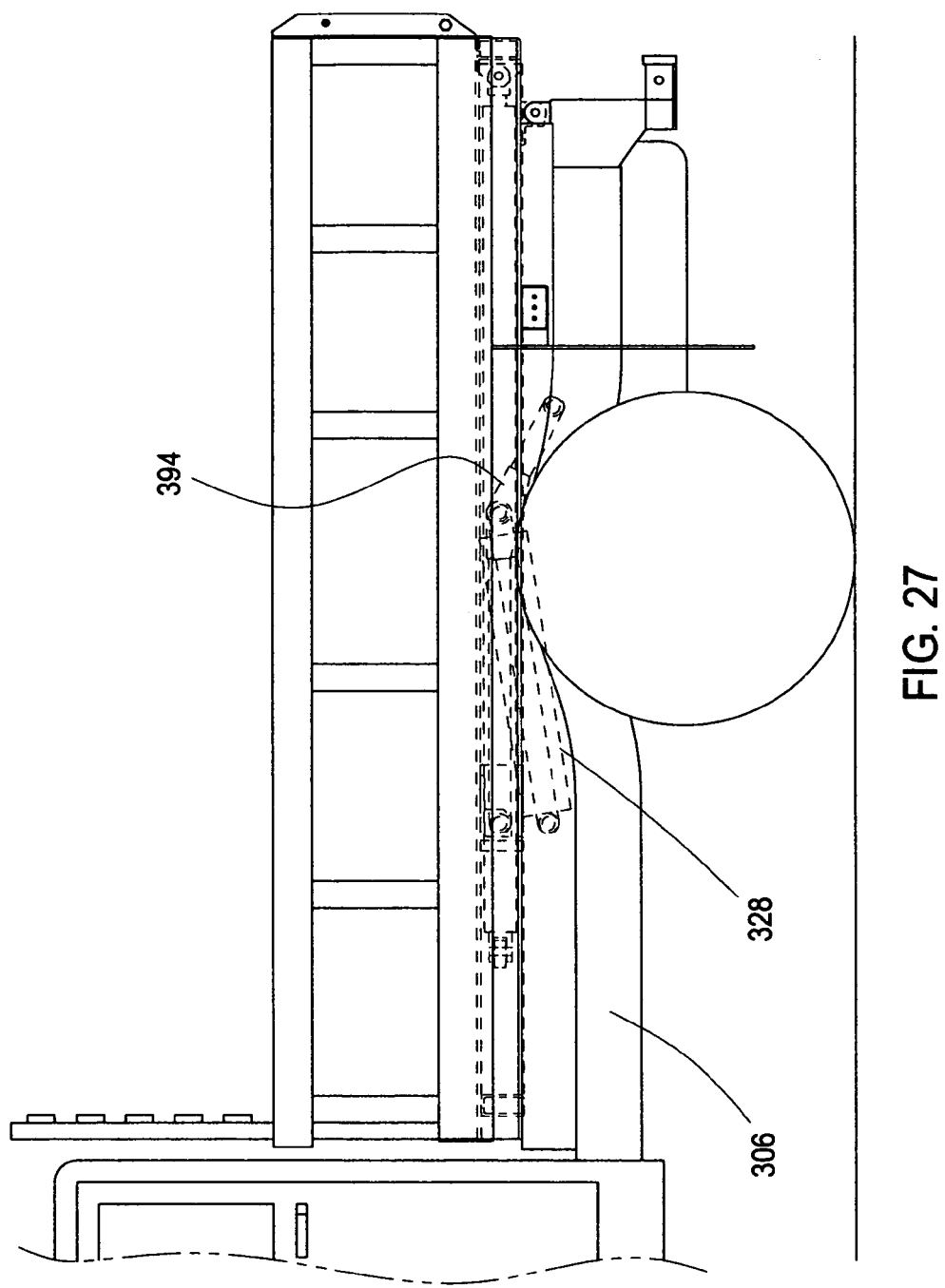
FIG. 27 is a side view of the truck shown in FIG. 25 wherein the truck includes a bed shown in the transport position.
Figure 28:
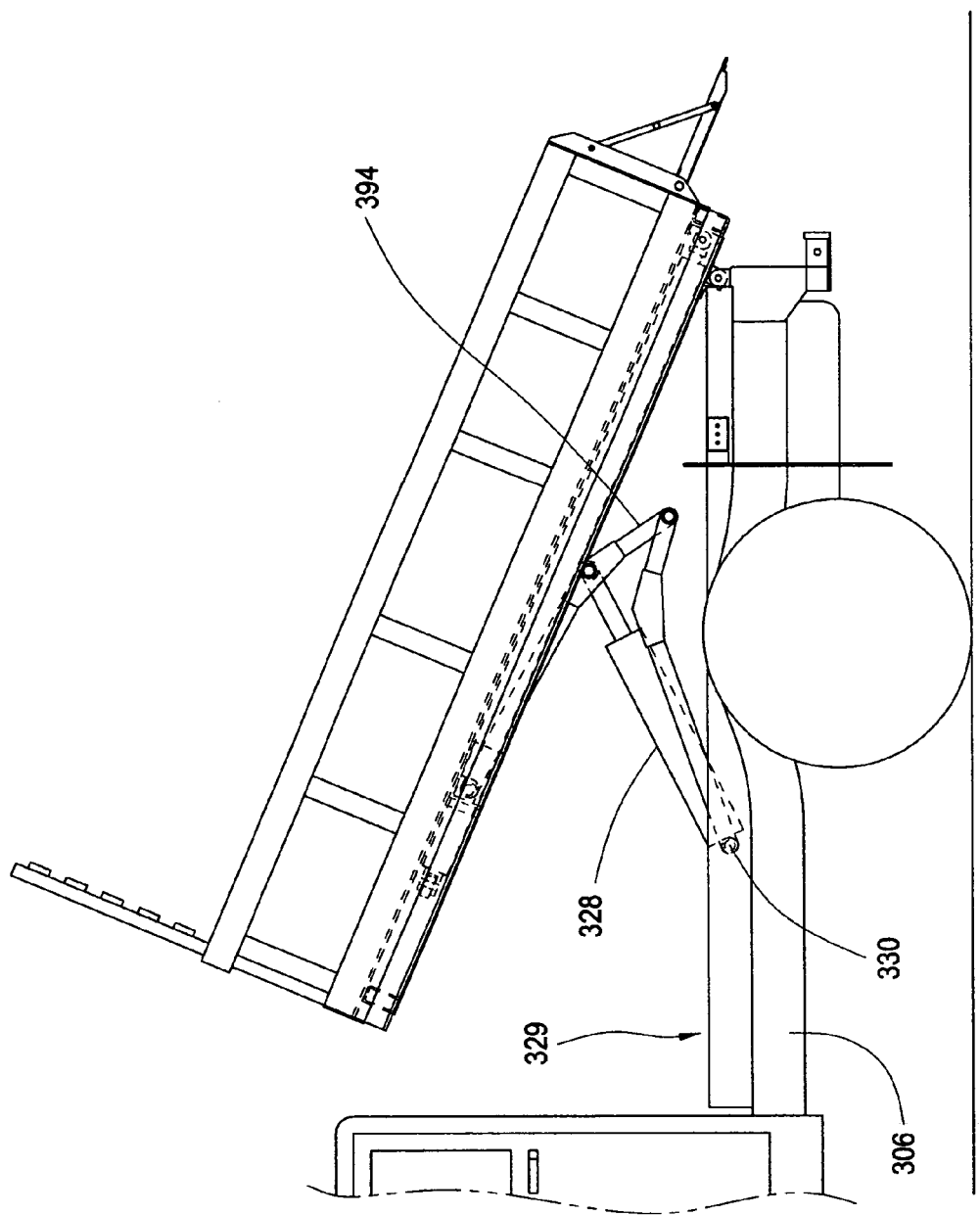
FIG. 28 is a side view of the truck shown in FIG. 27 and illustrating the bed in an intermediate dump position.

With reference to FIG. 25, the scissors 394 includes an end portion 398 coupled to the dump frame cross member 314. In this embodiment, the pivoting force applied to the dump frame cross member 314 is distributed at least partially along the width of the dump frame cross member 314. This, in turn, provides well-balanced and stable pivoting movement to the apparatus 300. In the illustrated embodiment, the dump frame 304 includes a front cross member 312 that enhances rigidity of the dump frame 304. But the front cross member 312 is not necessary for and may be eliminated in some embodiments, such as when the load for causing pivotal movement of the dump frame is more evenly distributed or spread out relative to the longitudinal dump frame members.

Figure 34:
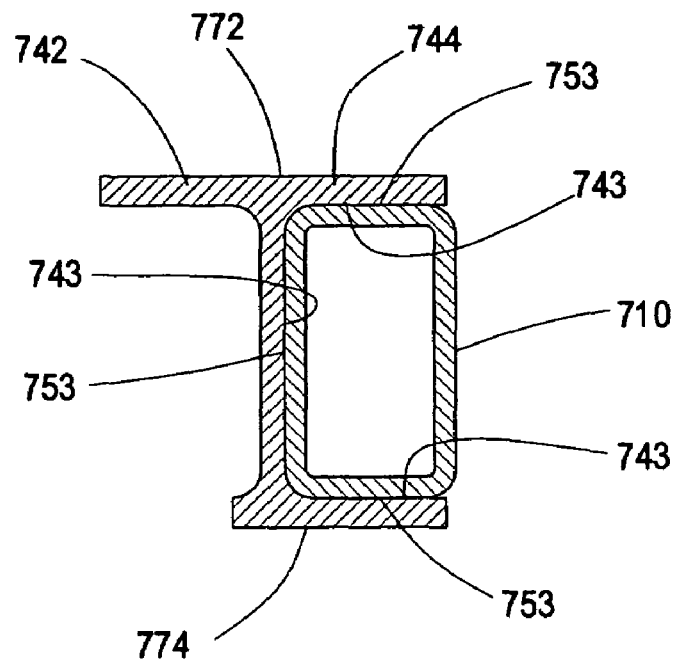
FIG. 34 illustrates transverse cross-sectional shapes that can be used for the dump frame longitudinal members and slide frame longitudinal members in another embodiment of an apparatus for dumping and providing ground access.
Figure 35:
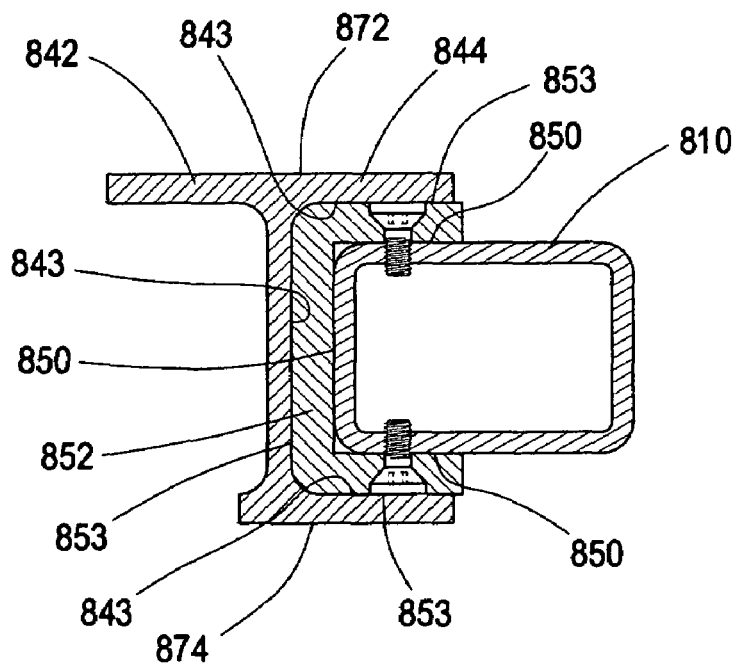
FIG. 35 illustrates transverse cross-sectional shapes that can be used for the dump frame longitudinal members and slide frame longitudinal members in another embodiment of an apparatus for dumping and providing ground access.

FIGS. 34 and 35 illustrate alternative cross-sectional shapes that can be used for dump frame longitudinal members 710, 810 and slide frame longitudinal members 742, 842. As shown in FIG. 34, the dump frame longitudinal member 710 is vertically disposed entirely within the height defined between the slide frame member's top and bottom surfaces 772 and 774. FIG. 34 does not show bearing material disposed along the sliding surfaces (which in the particular illustrated embodiment include three outer surfaces 753 of the dump frame longitudinal member 710 and the inner surfaces 743 defining the slide frame channel 744). Alternative embodiments, however, include bearing material disposed at least partially along one or more sliding surfaces.

As shown in FIG. 35, the dump frame longitudinal member 810 is vertically disposed entirely within the height defined between the top and bottom surfaces 872 and 874 of the slide frame longitudinal member 842. In addition, bearing material 852 is disposed along the sliding surfaces (which in the particular illustrated embodiment include the outer surfaces 853 of the bearing material 852 and the inner surfaces 843 defining the slide frame channel 844). In this particular embodiment, the bearing material 852 has a single-piece or monolithic construction, although other embodiments include a bearing material having a multi-piece construction (e.g., two-piece construction, three-piece construction, etc). The bearing material 852 seals the sliding surfaces 843 and 853 and inhibits foreign objects and debris from contacting the sliding surfaces 843 and 853. In addition, the bearing material 852 also reduces friction between the sliding surfaces 843 and 853.

Figure 36:
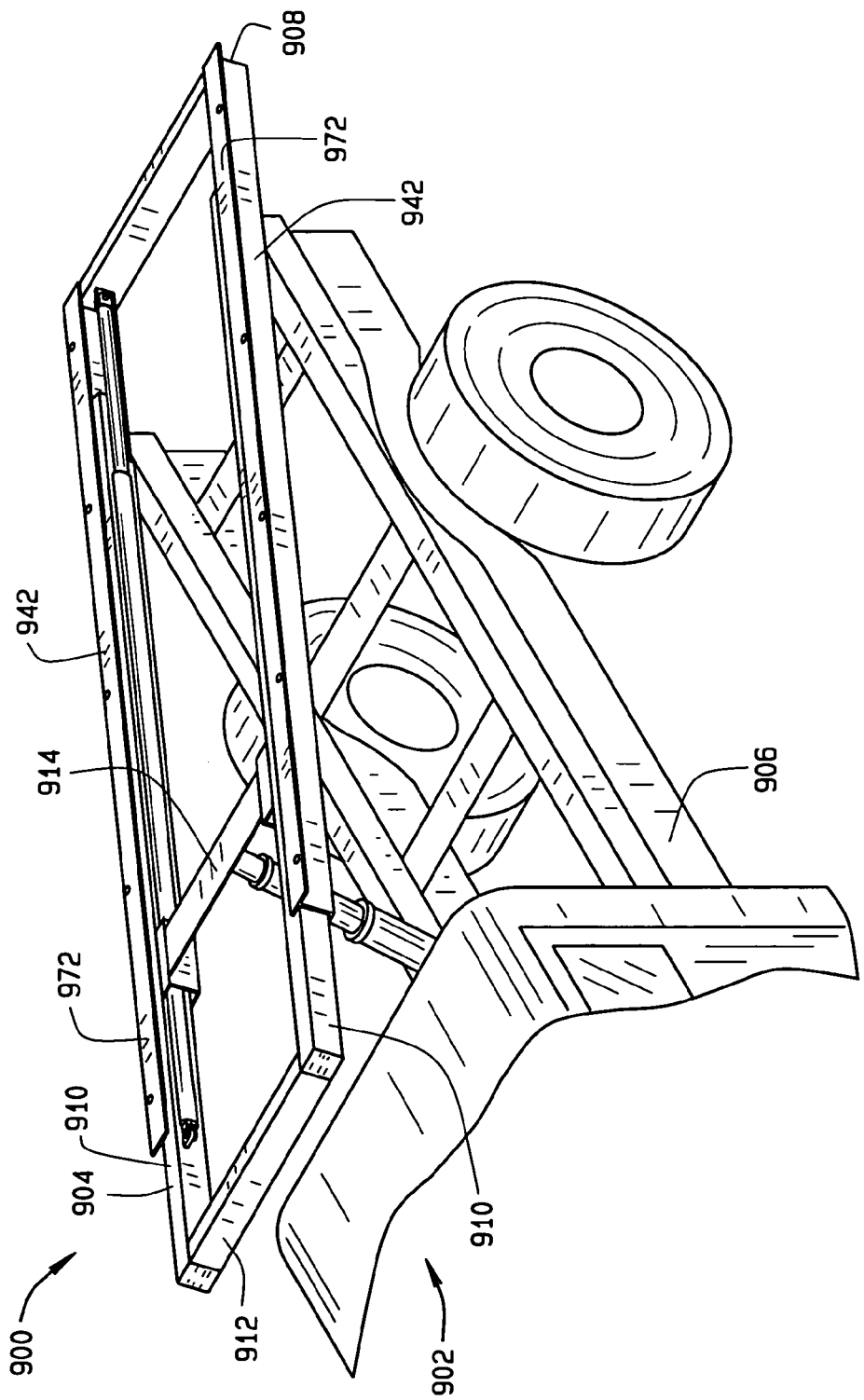
FIG. 36 is a perspective view of a truck having an apparatus for dumping and providing ground access according to another embodiment of the invention, and illustrating the apparatus in an intermediate load/dump position.
Figure 37:
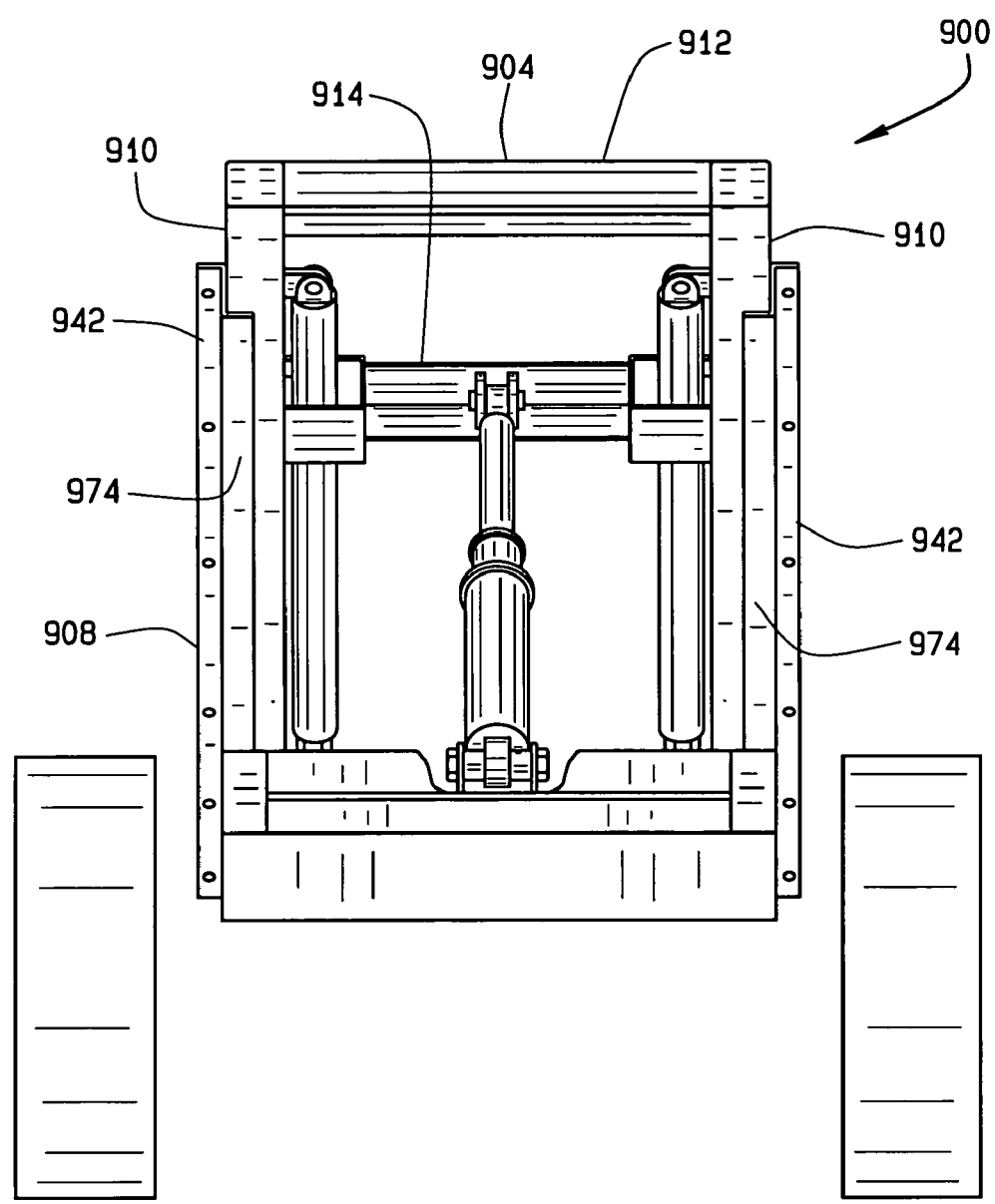
FIG. 37 is a front view of the truck shown in FIG. 36 with the cab removed for clarity.

FIGS. 36 and 37 illustrate another embodiment of an apparatus 900 that can be used with a vehicle 902 for dumping and providing ground access. As shown, the apparatus 900 includes a dump frame 904 pivotably coupled to the truck's chassis 906. The dump frame 904 includes a pair of longitudinal members 910, a front cross member 912, and an intermediate cross member 914.

The apparatus 900 also includes a slide frame 908 slidably coupled to the dump frame 904. The slide frame 908 includes a pair of longitudinal members or slide rails 942 disposed at least partially outside the dump frame 904.

In this particular embodiment, the dump frame longitudinal members 910 are vertically disposed entirely within the height defined between the top and bottom surfaces 972 (FIG. 36) and 974 (FIG. 37) of the slide frame longitudinal members 942. In addition, this particular embodiment does not include bearing material disposed along the sliding surfaces. But alternative embodiments include bearing material disposed at least partially along the sliding surfaces of the dump frame members 910.

Accordingly, various embodiments provide relatively compact and low-profile mechanisms for dumping and providing ground clearance, for example, to a bed of a pickup truck. In various embodiments, the mechanism has such a low profile and is contained within the width of the truck's chassis that the mechanism is not readily apparent to a casual observer. In addition, various embodiments also include actuators that are at least partially side-by-side and not stacked on top of each other such that the resulting device is relatively low profile. Further embodiments also seal the sliding surfaces to inhibit foreign objects and debris (e.g., dirt, dust, grime, sand, grit, other abrasive particles, etc.) from contacting the sliding surfaces. In some embodiments, the seal includes bearing material that also reduces friction between the sliding surfaces without a lubricant therebetween. By sealing the sliding surfaces in this manner, the sliding surfaces can be kept in a relatively clean condition, which, in turn, can provide a more aesthetically pleasing mechanism while also prolonging the useful life of the sliding surfaces.

The teachings of the present invention can be applied to a wide range of vehicles, including pickup trucks, other larger commercial-type trucks, trailers, and other vehicles having a chassis to which can be attached load-carrying apparatus, such as load-carrying platforms and beds. Accordingly, the specific references to pickup trucks should not be construed as limiting the scope of the present invention to any specific form/type of vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for a vehicle having a chassis, the apparatus comprising a dump frame pivotably coupled to the chassis for pivotal movement relative to the chassis, a slide frame for supporting a load, the slide frame slidably coupled to the dump frame such that the slide frame is longitudinally slidable relative to the dump frame, and such that the slide frame pivots along with the dump frame relative to the chassis, and at least one seal for substantially sealing at least one sliding surface of at least one of the slide frame and the dump frame to thereby inhibit the ingress of foreign objects and debris to the at least one sliding surface;

wherein the dump frame includes a longitudinal engagement portion having a length, wherein the slide frame includes a longitudinal channel for receiving the engagement portion of the dump frame, wherein the at least one seal includes a bearing material disposed along substantially the entire length of the engagement portion, the bearing material reducing friction associated with the engagement portion relatively sliding within the channel, and wherein the engagement portion includes a generally rectangular beam having three sides within the longitudinal channel, and wherein the bearing material is disposed along substantially the entire length of each of said three sides of the engagement portion.

2. The apparatus of claim 1, wherein the bearing material is disposed substantially along the entire length of at least one surface of at least one of the dump frame and the slide frame, the bearing material reducing friction associated with the sliding of the at least one surface relative to a corresponding other of said dump frame and said slide frame.

3. The apparatus of claim 2, further comprising a lubricant at least partially disposed along at least one sliding surface of the apparatus.

4. The apparatus of claim 2, wherein the bearing material is disposed along the entire length of the at least one surface.

5. The apparatus of claim 2, wherein the bearing material is removably attached to the dump frame.

6. The apparatus of claim 1, wherein the bearing material is configured to make contact with and substantially seal at least one of said three sides of the engagement portion along substantially the entire length of the at least one of said three sides to thereby inhibit foreign objects and debris from contacting the at least one of said three sides.

7. The apparatus of claim 1, wherein the bearing material is configured to make contact with and substantially seal each of said three sides of the engagement portion along substantially the entire length of each of said three sides to thereby inhibit foreign objects and debris from contacting each of said three sides.

8. The apparatus of claim 1, wherein the at least one seal includes at least one member external to the longitudinal channel and externally disposed at least partially across at least one interface between at least one surface of the slide frame and at least one surface of the dump frame to thereby inhibit the ingress of foreign objects and debris into the longitudinal channel along the at least one interface.

9. The apparatus of claim 1, wherein the at least one seal includes at least one member externally disposed at least partially across at least one interface between at least one surface of the slide frame and at least one surface of the dump frame to thereby inhibit the ingress of foreign objects and debris to the at least one surface of the slide frame and the at least one surface of the dump frame along the at least one interface.

10. The apparatus of claim 9, wherein the at least one member includes at least one resiliently flexible material.

11. The apparatus of claim 1, wherein the at least one seal includes a portion of the slide frame that extends at least partially over the dump frame.

12. The apparatus of claim 1, wherein the at least one seal includes a top portion of the slide frame that extends at least partially over a top portion of the dump frame, and a bottom portion of the slide frame that extends at least partially under a bottom portion of the dump frame.

13. A vehicle comprising the apparatus of claim 1.

* * * * *